US010168079B2

(12) United States Patent
Takeuchi et al.

(10) Patent No.: US 10,168,079 B2
(45) Date of Patent: *Jan. 1, 2019

(54) REFRIGERATION CYCLE DEVICE

(71) Applicant: DENSO CORPORATION, Kariya (JP)

(72) Inventors: Masayuki Takeuchi, Nukata-gun (JP); Seiji Inoue, Nukata-gun (JP); Takashi Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 450 days.

This patent is subject to a terminal disclaimer.

(21) Appl. No.: 14/384,392

(22) PCT Filed: Feb. 27, 2013

(86) PCT No.: PCT/JP2013/001144
§ 371 (c)(1),
(2) Date: Sep. 11, 2014

(87) PCT Pub. No.: WO2013/136693
PCT Pub. Date: Sep. 19, 2013

(65) Prior Publication Data
US 2015/0121939 A1 May 7, 2015

(30) Foreign Application Priority Data

Mar. 14, 2012 (JP) .................. 2012-056724
Aug. 9, 2012 (JP) .................. 2012-176873

(51) Int. Cl.
G05D 23/32 (2006.01)
F25B 13/00 (2006.01)
(Continued)

(52) U.S. Cl.
CPC .......... *F25B 13/00* (2013.01); *B60H 1/00278* (2013.01); *B60H 1/00921* (2013.01);
(Continued)

(58) Field of Classification Search
CPC .......... F25B 13/00; F25B 41/00; F25B 41/04; F25B 2309/061; F25B 2313/0234;
(Continued)

(56) References Cited

U.S. PATENT DOCUMENTS 4,840,037 A * 6/1989 Yamada .................... F25B 5/02
62/157
5,291,941 A 3/1994 Enomoto et al.
(Continued)

FOREIGN PATENT DOCUMENTS

DE  102007003870    * 8/2007 .............. F25B 13/00
DE  102007003870 A1 * 8/2007 .............. F25B 13/00
(Continued)

OTHER PUBLICATIONS

English translation DE102007003870.*
(Continued)

*Primary Examiner* — Ned Landrum
*Assistant Examiner* — Melodee Jefferson
(74) *Attorney, Agent, or Firm* — Harness, Dickey & Pierce, P.L.C.

(57) ABSTRACT

When a refrigerant flow-path switch performs switching to a first refrigerant flow path, an interior condenser heating air blown into an interior as a first temperature-adjustment subject and an auxiliary heat exchanger are connected in parallel, and the auxiliary heat exchanger heats air blown to a battery as a second temperature-adjustment subject. In contrast, when the refrigerant flow-path switch performs switching to a second refrigerant flow path, an interior evaporator cooling air blown into the interior and the auxiliary heat exchanger are connected in parallel, and the auxiliary heat exchanger cools the air blown to the battery. With this arrangement, one common auxiliary heat exchanger can cool or heat the air for the battery, thereby (Continued)

DEVICE-COOLING OPERATION MODE leading to reduction in size of an entire refrigeration cycle device.

18 Claims, 24 Drawing Sheets

(51) Int. Cl.
*F25B 6/04* (2006.01)
*F25B 25/00* (2006.01)
*F25B 41/04* (2006.01)
*B60H 1/00* (2006.01)
*B60L 11/18* (2006.01)
*F25B 5/00* (2006.01)
*H01M 10/625* (2014.01)
*H01M 10/6563* (2014.01)
*H01M 10/66* (2014.01)
*H01M 10/613* (2014.01)
*B60H 1/32* (2006.01)
*F25B 30/02* (2006.01)

(52) U.S. Cl.
CPC .......... *B60H 1/323* (2013.01); *B60L 11/1874* (2013.01); *F25B 5/00* (2013.01); *F25B 6/04* (2013.01); *F25B 25/005* (2013.01); *F25B 30/02* (2013.01); *F25B 41/04* (2013.01); *H01M 10/613* (2015.04); *H01M 10/625* (2015.04); *H01M 10/6563* (2015.04); *H01M 10/66* (2015.04); *B60H 2001/003* (2013.01); *B60H 2001/00942* (2013.01); *F25B 2341/0662* (2013.01); *F25B 2400/0409* (2013.01); *F25B 2400/0411* (2013.01); *Y02T 10/705* (2013.01); *Y02T 10/7005* (2013.01)

(58) Field of Classification Search
CPC .... F25B 2313/02731; F25B 2341/0012; F25B 2400/23; F25B 2700/1931; F25B 2700/1933; B60H 1/00278; B60H 2001/00307
See application file for complete search history.

(56) References Cited

U.S. PATENT DOCUMENTS

| | | | | |
|---|---|---|---|---|
| 5,408,836 A * | 4/1995 | Sjoholm | ............... | F01P 3/20 62/196.1 |
| 6,247,322 B1 * | 6/2001 | Ban | ............... | B60H 1/00914 62/228.3 |
| 9,467,087 B2 * | 10/2016 | Kondo | ............... | H02P 27/085 |
| 9,470,554 B2 * | 10/2016 | Kubota | ............... | G01D 5/145 |
| 9,479,108 B2 * | 10/2016 | Sakai | ............... | F04B 49/065 |
| 2002/0026803 A1 * | 3/2002 | Inoue | ............... | F25B 13/00 62/228.3 |
| 2004/0200233 A1 * | 10/2004 | Funakoshi | ............... | F25B 1/10 62/498 |
| 2006/0070719 A1 * | 4/2006 | Kim | ............... | F24F 1/26 165/61 |
| 2008/0190130 A1 * | 8/2008 | Murakami | ............... | F25B 13/00 62/324.3 |
| 2008/0197206 A1 * | 8/2008 | Murakami | ............... | F25B 13/00 237/2 B |
| 2009/0007589 A1 * | 1/2009 | Takegami | ............... | F25B 13/00 62/498 |
| 2009/0013702 A1 * | 1/2009 | Murakami | ............... | F25B 13/00 62/118 |
| 2009/0013705 A1 * | 1/2009 | Nishikawa | ............... | B60H 1/00 62/239 |
| 2009/0049857 A1 * | 2/2009 | Murakami | ............... | F25B 13/00 62/324.6 |
| 2009/0071177 A1 * | 3/2009 | Unezaki | ............... | F25B 13/00 62/196.1 |
| 2009/0193830 A1 * | 8/2009 | Yoshioka | ............... | B60H 1/0005 62/239 |
| 2009/0293515 A1 * | 12/2009 | Lifson | ............... | F24D 17/02 62/117 |
| 2010/0319376 A1 * | 12/2010 | Kawano | ............... | F25B 13/00 62/238.6 |
| 2011/0113805 A1 * | 5/2011 | Ko | ............... | F25B 13/00 62/234 |
| 2012/0043054 A1 * | 2/2012 | Shimazu | ............... | F25B 13/00 165/58 |
| 2013/0081419 A1 | 4/2013 | Katoh et al. | | |
| 2013/0199217 A1 * | 8/2013 | Arai | ............... | F25B 5/02 62/79 |
| 2014/0041826 A1 | 2/2014 | Takeuchi et al. | | |
| 2015/0191072 A1 * | 7/2015 | Inoue | ............... | B60H 1/22 62/186 |
| 2015/0295285 A1 * | 10/2015 | Takeuchi | ............... | F25B 5/00 62/498 |
| 2016/0010898 A1 * | 1/2016 | Takeuchi | ............... | B60H 1/00278 62/498 |
| 2016/0116197 A1 * | 4/2016 | Takeuchi | ............... | F25B 5/02 62/276 |

FOREIGN PATENT DOCUMENTS

| | | |
|---|---|---|
| JP | H05223357 A | 8/1993 |
| JP | 2002313441 A | 10/2002 |
| JP | 2003056930 A | 2/2003 |
| JP | 2004078440 A | 3/2004 |
| JP | 2008308080 A | 12/2008 |
| JP | 2010084951 A | 4/2010 |
| JP | 2010260450 A * | 11/2010 |
| JP | 2012-017092 | 1/2012 |
| JP | 2012232730 A | 11/2012 |

OTHER PUBLICATIONS

Office Action dated May 12, 2015 in corresponding Japanese Application No. 2012-176873.
International Search Report and Written Opinion (in Japanese with English Translation) for PCT/JP2013/001144, dated May 21, 2013; ISA/JP.
Advisory Action dated Feb. 9, 2016 in corresponding Japanese Application No. 2012-176873 with English translation.

* cited by examiner

INTERIOR-COOLING AND DEVICE-COOLING OPERATION MODE

COOLING OPERATION MODE

DEVICE-COOLING OPERATION MODE

INTERIOR-HEATING AND DEVICE-HEATING OPERATION MODE

HEATING OPERATION MODE

DEVICE-HEATING OPERATION MODE

INTERIOR-HEATING AND DEVICE-COOLING OPERATION MODE

INTERIOR-COOLING AND DEVICE-COOLING OPERATION MODE

COOLING OPERATION MODE

DEVICE-COOLING OPERATION MODE

INTERIOR-HEATING AND DEVICE-HEATING OPERATION MODE

HEATING OPERATION MODE

DEVICE-HEATING OPERATION MODE

INTERIOR-HEATING AND DEVICE-COOLING OPERATION MODE

INTERIOR-COOLING AND DEVICE-COOLING OPERATION MODE

COOLING OPERATION MODE

DEVICE-COOLING OPERATION MODE

INTERIOR-HEATING AND DEVICE-HEATING OPERATION MODE

HEATING OPERATION MODE

DEVICE-HEATING OPERATION MODE

INTERIOR-HEATING AND DEVICE-COOLING OPERATION MODE

INTERIOR-HEATING AND DEVICE-HEATING OPERATION MODE

REFRIGERATION CYCLE DEVICE

CROSS REFERENCE TO RELATED APPLICATION APPLICATIONS

This application is a U.S. National Phase Application under 35 U.S.C. 371 of International Application No. PCT/JP2013/001144 filed on Feb. 27, 2013 and published in Japanese as WO 2013/136693 A1 on Sep. 19, 2013. This application is based on and claims the benefit of priority from Japanese Patent Applications No. 2012-056724 filed on Mar. 14, 2012, and No. 2012-176873 filed on Aug. 9, 2012. The entire disclosures of all of the above applications are incorporated herein by reference.

FIELD OF THE INVENTION

The present invention relates to a refrigeration cycle device for adjusting temperatures of a plurality of types of subjects for temperature adjustment.

BACKGROUND ART

Conventional electric vehicles, including an electric car and a hybrid car, are designed to supply electric power stored in an electric storage device, such as a secondary battery, to an electric motor via an inverter or the like to thereby output a driving force for traveling. Those electric devices including the secondary battery, inverter, electric motor, and the like might malfunction or be broken when reaching high temperature due to self-heating or the like. For this reason, the electric vehicles need to be equipped with a temperature adjustment device for cooling such an electric device.

For example, Patent Document 1 discloses the use of a vapor compression refrigeration cycle device for cooling air to be blown into a vehicle interior in a vehicle air conditioner, as an example of the temperature adjustment device for cooling the electric device. More specifically, the refrigeration cycle device disclosed in Patent Document 1 includes two evaporators connected in parallel. One of the evaporators is adapted to cool the air to be blown into the vehicle interior, while the other one is adapted to cool a heat medium for cooling the electric device.

In other words, the refrigeration cycle device in Patent Document 1 is configured to adjust the temperatures of two types of subjects of temperature adjustment, namely, the air (first temperature-adjustment subject) and the heat medium (second temperature-adjustment subject).

RELATED ART DOCUMENT

Patent Document

[Patent Document 1]: JP-A-2002-313441

SUMMARY OF INVENTION

However, under low temperature, some of the electric devices described above cannot exhibit its performance sufficiently. For example, the secondary battery has its input and output characteristics degraded when reaching a low temperature. Thus, when the secondary battery is used under such a low-temperature atmosphere that cannot warm up the battery only by the self-heating, sufficient electric power might not be output, or regenerative power cannot be sufficiently used for charging.

Therefore, the temperature adjustment devices for the electric devices which are applied to electric vehicles need to have not only a function of simply cooling the electric device, but also another function of adjusting the temperature of the electric device in a predetermined temperature range by heating the electric device. However, the refrigeration cycle device disclosed in Patent Document 1 can cool only the heat medium, and thus cannot adjust the temperature of the electric device in the predetermined temperature range under the low-temperature atmosphere.

On the contrary, the inventors have proposed a refrigeration cycle device for a vehicle air conditioner that can be used as the temperature adjustment device for adjusting the temperature of the electric device in the predetermined temperature range, in a Japanese Patent Application No. 2011-91847 (hereinafter referred to as a prior application).

Specifically, the refrigeration cycle device of the prior application includes a heat exchanger for cooling a heat medium by exchanging heat between a low-pressure refrigerant and the heat medium for temperature adjustment of the electric device, and another heat exchanger for heating the heat medium by exchanging heat between a high-pressure refrigerant and the heat medium. Both the heat exchangers are used to cool or heat the heat medium, thereby adjusting the temperature of the electric device (specifically, secondary battery) in the predetermined temperature range.

Such a refrigeration cycle device of the prior application, however, includes two exclusive heat exchangers dedicated to respectively cool and heat the heat medium (second temperature-adjustment subject) to adjust the temperatures thereof, in addition to the structure of the normal refrigeration cycle for an air conditioner designed to adjust only the temperature of air (first temperature-adjustment subject). This disadvantageously leads to an increase in size of the entire refrigeration cycle device, and to a complicated structure of the cycle device.

In view of the foregoing matters, it is an object of the present invention to downsize a refrigeration cycle device that can adjust the temperatures of a plurality of types of subjects for temperature adjustment.

Further, it is another object of the present invention to simplify a cycle structure of a refrigeration cycle device that can adjust the temperatures of the plurality of types of subjects for temperature adjustment.

A refrigeration cycle device according to an aspect of the present disclosure includes: a compressor compressing and discharging a refrigerant; an exterior heat exchanger that exchanges heat between outside air and the refrigerant discharged from the compressor, and causes the refrigerant to flow out toward a side of a suction port of the compressor; a user-side heat exchanger that exchanges heat between a first temperature-adjustment subject and one of the refrigerant discharged from the compressor and the refrigerant flowing out of the exterior heat exchanger; an auxiliary heat exchanger that exchanges heat between the refrigerant and a second temperature-adjustment subject; and a refrigerant flow-path switch switching between refrigerant flow paths in each which the refrigerant circulates in a cycle. Furthermore, the refrigerant flow-path switch is capable of switching at least between a first refrigerant flow path and a second refrigerant flow path. The first refrigerant flow path allows the refrigerant in a range from a discharge port side of the compressor to an inlet side of the exterior heat exchanger to flow into the auxiliary heat exchanger, and guides the refrigerant flowing from the auxiliary heat exchanger to the inlet side of the exterior heat exchanger. The second refrigerant flow path allows the refrigerant in a range from an outlet side of the exterior heat exchanger to a suction port side of the compressor to flow into the auxiliary heat exchanger, and guides the refrigerant flowing from the auxiliary heat exchanger to the suction port side of the compressor.

With this arrangement, the user-side heat exchanger can exchange heat between the first temperature-adjustment subject and the high-temperature refrigerant discharged from the compressor or low-temperature refrigerant flowing from the exterior heat exchanger to thereby adjust the temperature of the first temperature-adjustment subject.

When the refrigerant flow-path switch performs switching to the first refrigerant flow path, the auxiliary heat exchanger can exchange heat between the second temperature-adjustment subject and the high-temperature refrigerant in a range from the discharge port side of the compressor to the inlet side of the exterior heat exchanger, thereby heating the second temperature-adjustment subject. When the refrigerant flow-path switch performs switching to the second refrigerant flow path, the auxiliary heat exchanger can exchange heat between the second temperature-adjustment subject and the low-temperature refrigerant in a range from the outlet side of the exterior heat exchanger to the suction port side of the compressor, thereby cooling the second temperature-adjustment subject.

Therefore, the refrigeration cycle device of the present disclosure can adjust the temperatures of a plurality of types of temperature-adjustment subjects, including the first temperature-adjustment subject and the second temperature-adjustment subject. In this case, only one common auxiliary heat exchanger can be used to cool or heat the second temperature-adjustment subject. As a result, this embodiment can reduce the size of the entire refrigeration cycle device as compared to a structure for cooling or heating the second temperature-adjustment subject using a plurality of heat exchangers.

The refrigeration cycle device of the present disclosure can guide the low-temperature refrigerant or high-temperature refrigerant to the one common auxiliary heat exchanger, thereby simplifying the cycle structure of the entire refrigeration cycle device as compared to a structure for guiding the low-temperature refrigerant or high-temperature refrigerant to a plurality of heat exchangers. As a result, it can improve the mountability of the refrigeration cycle device on a product.

DESCRIPTION OF EMBODIMENTS

First Embodiment

Figure 1:
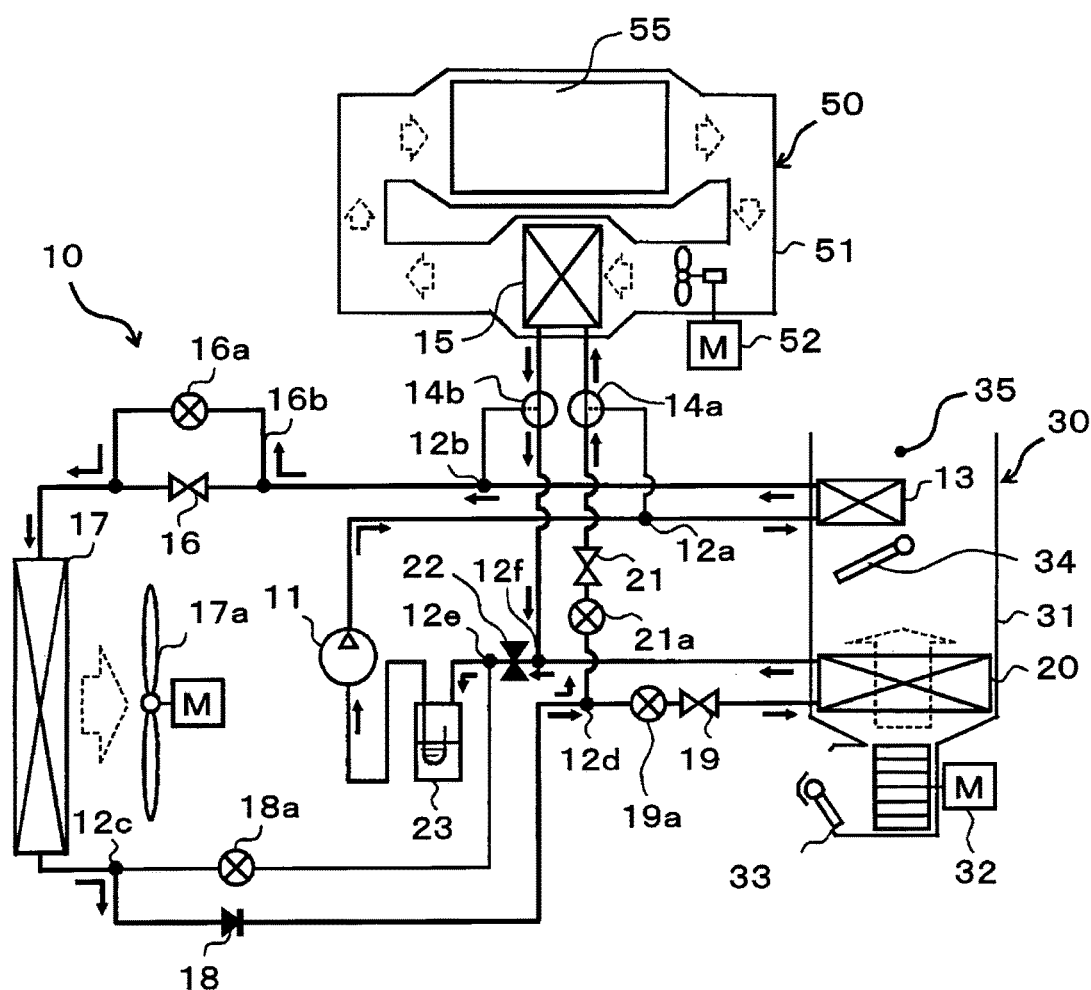
FIG. 1 is an entire configuration diagram showing a refrigerant flow in an interior-cooling and device-cooling operation mode of a refrigeration cycle device according to a first embodiment of the present disclosure.

A first embodiment of the present disclosure will be described below with reference to FIGS. 1 to 7. In this embodiment of the present disclosure, a refrigeration cycle device 10 is applied to an electric vehicle that is designed to obtain a driving force for traveling from an electric motor for traveling. Further, in the electric car of this embodiment, the refrigeration cycle device 10 can be used to control air conditioning (cooling and heating) of a vehicle interior, and also to adjust the temperature of (cooling and heating) a secondary battery (device) 55 which serves as an electric storage device for storing therein electric power to be supplied to the electric motor for traveling.

More specifically, the refrigeration cycle device 10 performs a function of adjusting the temperature of air for the vehicle interior to be blown into a vehicle compartment, and another function of adjusting the temperature of air for the battery to be blown toward the secondary battery 55. In other words, the refrigeration cycle device 10 of this embodiment is adapted to adjust the temperatures of a plurality of types of subjects for temperature adjustment, namely, the air for the vehicle interior (first temperature-adjustment subject) and the air for the battery (second temperature-adjustment subject).

A compressor 11 among components of the refrigeration cycle 10 is positioned in a bonnet or hood, and is to suck, compress, and discharge the refrigerant in the refrigeration cycle device 10. The compressor is an electric compressor which drives a fixed displacement compression mechanism with a fixed discharge capacity by use of an electric motor. The electric motor of the compressor 11 has its operation (the number of revolutions) controlled by a control signal output from a controller to be described later.

The refrigeration cycle 10 employs a hydrofluorocarbon (HFC) refrigerant (namely, R134a) as the refrigerant, and forms a subcritical refrigeration cycle of a vapor compression type whose high-pressure side refrigerant pressure does not exceed the critical pressure of the refrigerant. Obviously, a hydrofluoro-olefin (HFO) refrigerant (namely, R1234yf) or the like may be used as the refrigerant. Refrigerating machine oil for lubricating the compressor 11 is mixed into the refrigerant, and a part of the refrigerating machine oil circulates through the cycle together with the refrigerant.

A discharge port side of the compressor 11 is connected to a refrigerant inlet of a first branch portion 12a to branch the flow of refrigerant discharged from the compressor 11. The first branch portion 12a is formed of a three-way coupling having three inlet and outlet ports, one of which is a refrigerant inlet, and the remaining two of which are refrigerant outlets. Such a three-way coupling may be formed by jointing pipes with different diameters, or by forming a plurality of refrigerant passages in a metal or resin block.

One of the refrigerant outlets of the first branch portion 12a is connected to a refrigerant inlet of an interior condenser 13. The interior condenser 13 is disposed in a casing 31 that forms an air passage for air of the vehicle interior in an interior air conditioning unit 30. The interior condenser 13 is a heat exchanger for heat dissipation among the user-side heat exchangers described in the accompanied claims. The interior condenser 13 exchanges heat between the refrigerant discharged from the compressor 11 and the air for the interior having passed through an interior evaporator 20 (to be described later) to thereby dissipate heat from the refrigerant. The details of the interior air conditioning unit 30 will be described later.

A refrigerant outlet side of the interior condenser 13 is connected to one of refrigerant inlets of a first merging portion 12b. The first merging portion 12b is formed of the same type of three-way coupling as the first branch portion 12a. The three-way coupling has three inlet and outlet ports, two of which are refrigerant inlets, and the remaining one of which is a refrigerant outlet.

In contrast, the other refrigerant outlet of the first branch portion 12a is connected to a first three-way valve 14a. The three-way valve 14a is an electric three-way valve whose operation is controlled by a control voltage output from the controller.

Specifically, the first three-way valve 14a is adapted to switch between a refrigerant flow path for connecting the other outlet side of the first branch portion 12a to the refrigerant inlet side of an auxiliary heat exchanger 15, and another refrigerant flow path for connecting the outlet side of an expansion valve 21 for a battery to be described later and the refrigerant inlet side of the auxiliary heat exchanger 15. Thus, the first three-way valve 14a serves as a refrigerant flow-path switch for switching between the refrigerant flow paths for allowing the refrigerant to circulate through the cycle.

The auxiliary heat exchanger 15 is disposed in a battery pack 50 that forms an air passage for the battery to be blown toward the secondary battery 55. The auxiliary heat exchanger 15 is to adjust the temperature of the air for the battery by exchanging heat between the refrigerant flowing therethrough and the air for the battery. The details of the battery pack 50 will be described later. A refrigerant outlet side of the auxiliary heat exchanger 15 is connected to a second three-way valve 14b. The second three-way valve 14b has the same basic structure as that of the first three-way valve 14a.

Specifically, the second three-way valve 14b is adapted to switch between a refrigerant flow path for connecting the refrigerant outlet side of the auxiliary heat exchanger 15 and the other refrigerant inlet of the first merging portion 12b, and another refrigerant flow path for connecting the refrigerant outlet side of the auxiliary heat exchanger 15 and one refrigerant inlet of a third merging portion 12f to be described later. Thus, the second three-way valve 14b serves as a refrigerant flow-path switch for switching between the refrigerant flow paths for allowing the refrigerant to circulate through the cycle, like the first three-way valve 14a.

A refrigerant outlet of the first merging portion 12b is connected to an inlet side of an expansion valve 16 for heating. The expansion valve 16 decompresses the refrigerant flowing out of the first merging portion 12b when the air for the interior is heated to thereby heat the vehicle interior.

The expansion valve 16 for heating is an electric expansion valve including a valve body whose throttle opening is adjustable, and an electric actuator with a stepping motor for changing the throttle opening of the valve body. The expansion valve 16 has its operation controlled by a control signal output from the controller. A refrigerant outlet side of the expansion valve 16 for heating is connected to a refrigerant inlet side of an exterior heat exchanger 17.

Further, a refrigerant outlet of the first merging portion 12b is connected to a bypass passage 16b for allowing the refrigerant flowing out of the first merging portion 12b to bypass the expansion valve 16 for heating to be guided to the refrigerant inlet side of the exterior heat exchanger 17. The bypass passage 16b is provided with a bypass passage opening/closing valve 16a for opening and closing the bypass passage 16b. The bypass passage opening/closing valve 16a is an electromagnetic valve whose opening and closing operations are controlled by a control pressure output from the controller.

A loss in pressure caused when the refrigerant passes through the bypass passage opening/closing valve 16a is much smaller than that caused when the refrigerant passes through the expansion valve 16 for heating. Thus, the refrigerant having flowed out of the first merging portion 12b flows into the exterior heat exchanger 17 via the bypass passage 16b without being decompressed when the bypass passage opening/closing valve 16a is open, and flows into the exterior heat exchanger 17 while being decompressed by the expansion valve 16 for heating when the bypass passage opening/closing valve 16a is closed.

The bypass passage opening/closing valve 16a forms a refrigerant flow-path switch. As such a refrigerant flow-path switch, an electric three-way valve or the like may be employed which is adapted to switch between a refrigerant flow path for connecting the refrigerant outlet side of the first merging portion 12b to the inlet side of the expansion valve 16 for heating, and another refrigerant flow path for connecting the refrigerant outlet side of the first merging portion 12b to the inlet side of the bypass passage opening/closing valve 16a.

An expansion valve with a fully-opening function can be used as the expansion valve 16 for heating to thereby fully open the throttle opening of its valve body, so that a decompression effect is hardly exhibited, which can abolish the bypass passage 16b and bypass passage opening/closing valve 16a. However, like this embodiment, the bypass passage 16b and the bypass passage opening/closing valve 16a are desirably provided to improve the response to switching between a state of decompression of the refrigerant flowing from the first merging portion 12b into the exterior heat exchanger 17 and another state of non-decompression of the refrigerant.

The exterior heat exchanger 17 is disposed in the bonnet of the vehicle, and to exchange heat between the refrigerant flowing therethrough and outside air blown from a blower fan 17a. More specifically, the exterior heat exchanger 17 serves as an evaporator for exhibiting a heat absorption effect by evaporating a low-pressure refrigerant when warming the vehicle interior by heating the air for the interior, and also serves as a radiator for dissipating heat from a high-pressure refrigerant when cooling or air-conditioning the vehicle interior by cooling the air for the interior.

The blower fan 17a is an electric blower whose operating ratio, that is, whose number of revolutions (volume of air) is controlled by a control voltage output from the controller. An outlet side of the exterior heat exchanger 17 is connected to a refrigerant inlet of a second branch portion 12c the branch the flow of refrigerant discharged from the exterior heat exchanger 17.

One of the refrigerant outlets of the second branch portion 12c is connected to a refrigerant inlet of a third branch portion 12d via a check valve 18. The other one of the refrigerant outlets of the second branch portion 12c is connected to one refrigerant inlet of a second merging portion 12e via a suction side opening/closing valve 18a. The basic structures of the second and third branch portions 12c and 12d and the second and third merging portions 12e and 12f are the same as those of the first branch portion 12a and the first merging portion 12b, respectively.

The check valve 18 allows the refrigerant only to flow from a side of the second branch portion 12c (on the refrigerant outlet side of the exterior heat exchanger 17) to the third branch portion 12d side (refrigerant inlet side of the interior evaporator 20 or refrigerant inlet side of the auxiliary heat exchanger). Thus, the check valve 18 prevents backflow of the refrigerant from the refrigerant inlet side of the interior evaporator 20 or the refrigerant inlet side of the auxiliary heat exchanger to the refrigerant outlet side of the exterior heat exchanger 17.

The suction side opening/closing valve 18a is an electromagnetic valve having the same structure as that of the bypass passage opening/closing valve 16a. When the suction side opening/closing valve 18a is open, the refrigerant having flowed out of the exterior heat exchanger 17 flows into an accumulator 23 to be described later via the second merging portion 12e. In contrast, when the suction side opening/closing valve 18a is closed, the refrigerant having flowed out of the exterior heat exchanger 17 flows into the third branch portion 12d via the check valve 18. Thus, the suction side opening/closing valve 18a serves as the refrigerant flow-path switch.

One refrigerant outlet of the third branch portion 12d is connected to a refrigerant inlet side of the interior evaporator 20 via an opening/closing valve 19a for cooling and an expansion valve 19 for cooling. The other refrigerant outlet of the third branch portion 12d is connected to the above-mentioned first three-way valve 14a via an opening/closing valve 21a for the battery and the expansion valve 21 for the battery.

The opening/closing valve 19a for cooling is an electromagnetic valve with the same structure as the bypass passage opening/closing valve 16a. The opening/closing valve 19a can switch between the refrigerant flow paths for the refrigerant circulating through the cycle by opening and closing a refrigerant passage from one refrigerant outlet side of the third branching portion 12d to the refrigerant inlet side of the interior evaporator 20. Thus, the opening/closing valve 19a for cooling serves as the refrigerant flow-path switch.

The expansion valve 19 for cooling is an electric expansion valve with the same structure as the expansion valve 16 for heating. The expansion valve 19 is a decompression device for decompressing the refrigerant flowing out of the exterior heat exchanger 17 into the interior evaporator 20 when air-conditioning or cooling the vehicle interior by cooling the air for the interior.

The interior evaporator 20 is disposed on the upstream side of the air flow with respect to the interior condenser 13 within the casing 31 of the interior air conditioning unit 30. The interior evaporator 20 among the user-side heat exchangers described in the claims serves as a heat exchanger for evaporation that exchanges heat between the air for the interior and the refrigerant decompressed by the expansion valve 19 for cooling to cause the refrigerant to evaporate. A refrigerant outlet side of the interior evaporator 20 is connected to the other refrigerant inlet of the third merging portion 12f.

An expansion valve with a fully-closing function can be used as the expansion valve 19 for cooling to fully close the throttle opening of its valve body, thereby closing the refrigerant passage, which can abolish the opening/closing valve 19a for cooling. However, like this embodiment, the opening/closing valve 19a for cooling is desirably provided to improve the response to switching between a state of decompression of the refrigerant flowing from the third branching portion 12d into the interior evaporator 20 and another state of fully-closing the throttle opening of its valve body. The same goes for the opening/closing valve 21a for the battery, which will be described below.

The opening/closing valve 21a for the battery is an electromagnetic valve with the same structure as the bypass passage opening/closing valve 16a. The opening/closing valve 21a can switch between the refrigerant flow paths for the refrigerant circulating through the cycle by opening and closing a refrigerant passage from the other refrigerant outlet side of the third branching portion 12d to the refrigerant inlet side of the first three-way valve 14a. Thus, the opening/closing valve 21a for the battery serves as the refrigerant flow-path switch.

The expansion valve 21 for the battery is an electric expansion valve with the same structure as the expansion valve 16 for heating. The expansion valve 21 is to decompress the refrigerant flowing into the auxiliary heat exchanger 15 when air-conditioning or cooling the secondary battery 55 by cooling the air for the battery.

A refrigerant outlet of the third merging portion 12f is connected to the other refrigerant inlet of the second merging portion 12e via a fixed throttle 22. The fixed throttle 22 is disposed to prevent backflow of the refrigerant from the second merging portion 12e to the third merging portion 12f. Specifically, an orifice or capillary tube whose amount of decompression is relatively small can be employed as the fixed throttle 22. The fixed throttle 22 may be abolished in order to reduce the power consumption of the compressor 11.

A refrigerant outlet of the second merging portion 12e is connected to an inlet side of the accumulator 23. The accumulator 23 is a gas-liquid separator that separates the refrigerant flowing thereinto into liquid and gas phases to store therein the excessive refrigerant within the cycle. A gas-phase refrigerant outlet of the accumulator 23 is connected to a suction side of the compressor 11. Thus, the accumulator 23 serves to suppress the suction of the liquid-phase refrigerant into the compressor 11 to thereby prevent the compression of the liquid in the compressor 11.

Now, the interior air conditioning unit 30 will be described below. The interior air conditioning unit 30 is to blow the air for the interior whose temperature is adjusted, into the vehicle compartment. The interior air conditioning unit 30 is disposed inside a gauge board (instrument panel) at the forefront of a vehicle compartment. The unit 30 accommodates a blower 32, the above-mentioned interior condenser 13, the interior evaporator 20, and the like in the casing 31 forming an outer envelope.

The casing 31 forms therein an air passage for the air for the interior. The casing 31 is formed of resin (for example, polypropylene) having some degree of elasticity and excellent strength. An inside/outside air switch 33 that switches between the air (inside air) for the vehicle interior and the outside air is disposed on the most upstream side of the air flow in the casing 31.

The inside/outside air switch 33 has an inside air introduction port for introducing inside air into the casing 31, and an outside air introduction port for introducing outside air into the casing 31. An inside/outside air switching door is positioned inside the inside/outside air switch 33 to continuously adjust the opening areas of the inside air introduction port and the outside air introduction port to thereby change the ratio of the introduced amount of the inside air to the outside air.

On the downstream side of air flow of the inside/outside air switch 33, the blower 32 is provided for blowing air introduced via the inside/outside air switch 33 toward the vehicle interior. The blower 32 is an electric blower that drives a centrifugal multi-blade fan (sirrocco fan) by an electric motor. The blower 32 has the number of revolutions (i.e., air blowing volume) controlled by a control voltage output from the controller.

The interior evaporator 20 and the interior condenser 13 are disposed on the downstream side of the air flow of the blower 32 in that order with respect to the flow of the air for the interior. In other words, the interior evaporator 20 is disposed on the upstream side in the flow direction of the air for the interior with respect to the interior condenser 13.

An air mix door 34 is disposed on the downstream side of the air flow in the interior evaporator 20 and on the upstream side of the air flow in the interior condenser 13. The air mix door 34 adjusts the rate of the volume of the air passing through the interior condenser 13 among the air having passed through the interior evaporator 20. A mixing space 35 is provided on the downstream side of the air flow in the interior condenser 13 so as to mix the air heated by exchanging heat with the refrigerant in the indoor condenser 13 with the air not heated while bypassing the interior condenser 13.

Openings for blowing the conditioned air mixed in the mixing space 35, into the vehicle interior as a space to be conditioned are disposed on the most downstream side of the air flow in the casing 31. Specifically, the openings include a face air opening for blowing the conditioned air toward the upper body of a passenger in the vehicle compartment, a foot air opening for blowing the conditioned air toward the foot of the passenger, and a defroster air opening for blowing the conditioned air toward the inner side of a front glass of the vehicle (these openings are not shown).

Thus, the air mix door 34 adjusts the rate of the volume of air passing through the interior condenser 13 to thereby adjust the temperature of conditioned air mixed in the mixing space 35, controlling the temperature of the conditioned air blown from each opening. That is, the air mix door 34 serves as a temperature adjustment device for adjusting the temperature of the conditioned air to be blown into the vehicle interior. The air mix door 34 is driven by a servo motor (not shown) whose operation is controlled by a control signal output from the controller.

A face door for adjusting an opening area of the face air opening is positioned on the upstream side of the air flow of the face air opening, a foot door for adjusting an opening area of the foot air opening is positioned on the upstream side of the air flow of the foot air opening, and a defroster door for adjusting an opening area of the defroster air opening is positioned on the upstream side of the air flow of the defroster air opening (these doors being not shown).

The face door, foot door, and defroster door serve as an opening mode switching device for switching among opening modes, and are driven by a servo motor (not shown) whose operation is controlled by a control signal output from the controller via a link mechanism or the like.

Next, the battery pack 50 will be described below. The battery pack 50 is disposed on a side of the bottom surface of the vehicle located between a luggage space and back seat on the rear side of the vehicle. The battery pack includes a metal casing 51 subjected to an electric-insulating treatment (for example, insulating coating), and forms an air passage for blowing the air for the battery into the casing 51 if necessary, causing the air to circulate therethrough. The battery pack 50 accommodates a blower 52, the above-mentioned auxiliary heat exchanger 15, and the battery 55 in the air passage.

The blower 52 is disposed on the upstream side of the air flow of the auxiliary heat exchanger 15. The blower 52 is an electric blower that is adapted to blow the air for the battery toward the auxiliary heat exchanger 15. The blower 52 has an operating rate, that is, the number of revolutions (air blowing volume) controlled by a control voltage output from the controller. Further, the secondary battery 55 is disposed on the downstream side of the air flow in the auxiliary heat exchanger 15. The downstream side of the air flow of the secondary battery 55 communicates with the suction port side of the blower 52.

Thus, once the blower 52 is operated, the air for the battery whose temperature is adjusted by the auxiliary heat exchanger 15 is blown to the secondary battery 55, thereby adjusting the temperature of the secondary battery 55. Then, the air for the battery having adjusting the temperature of the secondary battery 55 is sucked into the blower 52 to be blown again toward the auxiliary heat exchanger 15.

Next, an electric controller of this embodiment will be described below. The controller is constructed of a known microcomputer, including CPU, ROM, RAM, and the like, and a peripheral circuit thereof. The controller controls the operations of various devices to be controlled 11, 14a, 14b, 16, 16a, 17a, 18a, 19, 19a, 21, 21a, 32, 52, and the like which are connected to the output side by performing various kinds of computations and processing based on control programs stored in the ROM.

A group of various control sensors is connected to the input side of the controller. The sensors include an inside air sensor for detecting a temperature of the vehicle interior Tr, an outside air sensor for detecting a temperature of the outside air Tam, a solar radiation sensor for detecting an amount of solar radiation Ts in the vehicle interior, and an evaporator temperature sensor for detecting a temperature of blown air (evaporation temperature) Tefin of the interior evaporator 20. The sensors also include a blown air temperature sensor for detecting the temperature of the air TAV blown from the mixing space 35 into the vehicle interior, and a battery temperature sensor that serves as a temperature detector for detecting a battery temperature Tb which is the temperature of the secondary battery 55.

Specifically, the evaporator temperature sensor of this embodiment detects the temperature of heat exchanging fins of the interior evaporator 20. Obviously, the evaporator temperature sensor for use may be a temperature detector for detecting the temperature of any part of the interior evaporator 20 other than fins, or a temperature detector for directly detecting the temperature of the refrigerant itself flowing through the interior evaporator 20.

The secondary battery 55 has a larger thermal capacity and is more likely to have a temperature distribution as compared to respective components of the refrigeration cycle device 10. For this reason, this embodiment uses a plurality of temperature detectors to detect a plurality of points of the inside and surfaces of the secondary battery 55, and then determines a battery temperature Tb by averaging detected values obtained from the temperature detectors.

In this embodiment, the blown air temperature sensor is provided for detecting the blown air temperature TAV. Instead of this, the blown air temperature TAV for use may be a value calculated based on an evaporator temperature Tefin, a discharged refrigerant temperature Td, or the like.

An operation panel (not shown) is disposed near an instrument board at the front of the vehicle compartment, and connected to the input side of the controller. Operation signals are input from various types of operation switches provided on the operation panel. Various operation switches provided on the operation panel include an air-conditioning operation switch for requesting air conditioning of a vehicle interior, a vehicle interior temperature setting switch for setting a vehicle interior temperature, a selection switch for an air-conditioning operation mode, and the like.

The controller of this embodiment is integrally structured with a control unit for controlling various devices for control connected to an output side of the controller. Each of the control units for controlling the operations of the devices for control may include a structure (hardware and software) that is adapted to control the operation of each of the devices for control.

For example, among the control units, the structure (hardware and software) for controlling the operation of the compressor 11 serves as a refrigerant discharge capacity control unit, and the structure for controlling the operation of each of the devices 14a, 14b, 16a, 18a, 19a, and 21a which configure the refrigerant flow-path switch serves as a refrigerant flow-path switch control unit.

Next, the operation of the refrigeration cycle device 10 with the above-mentioned structure in this embodiment will be described below. As mentioned above, the refrigeration cycle device 10 can adjust the temperature of the secondary battery 55, while performing air conditioning of the vehicle interior.

The operation modes of air conditioning of the vehicle interior include a cooling mode of cooling the vehicle interior, and a heating mode of heating the vehicle interior. The operation modes of adjustment of the temperature of the secondary battery 55 include a heating mode of heating the secondary battery 55, and a cooling mode of cooling the secondary battery 55. Switching between these operation modes is performed by executing a control program that is previously stored in a storage circuit by the controller.

The control program is executed to repeat a control routine. The control routine involves reading detection signals from a group of sensors for control and an operation signal from the operation panel, determining the control state of each of various devices to be controlled based on the values of the detection signals and operation signal read, and outputting a control signal or control voltage to each control device to be controlled so as to obtain the determined control state.

In the case of reading the operation signal from the operation panel in the operation mode of air conditioning of the vehicle interior, the heat exchanger is switched to the cooling mode when cooling is selected by the selection switch with an air-conditioning operation switch turned on (ON), whereas the heat exchanger is switched to the heating mode when heating is selected by the selection switch with the air-conditioning operation switch turned on (ON).

In the case of reading the detection signal from the sensor group for control in the operation mode of air adjustment of the secondary battery 55, the refrigeration cycle device is switched to the heating mode of heating the secondary battery 55 when the battery temperature Tb is equal to or lower than a first reference temperature Tk1 (in this embodiment, 10° C.). In contrast, the refrigeration cycle device is switched to the cooling mode of cooling the secondary battery when the battery temperature Tb is equal to or higher than a second reference temperature Tk2 (in this embodiment, 40° C.).

Now, a description will be given of the operation of each of the operation modes.

(a) Interior-Cooling and Device-Cooling Operation Mode

The interior-cooling and device-cooling operation mode is an operation mode of cooling the vehicle interior and also cooling the secondary battery 55 at the same time. More specifically, this operation mode is performed with an operation switch of the operation panel turned on (ON) when cooling is selected by the selection switch and the battery temperature Tb is equal to or higher than the second reference temperature Tk2.

In the interior-cooling and device-cooling operation mode, the controller controls the operation of the first three-way valve 14a so as to connect the refrigerant outlet side of the expansion valve 21 for the battery to the refrigerant inlet side of the auxiliary heat exchanger 15. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, opens the opening/closing valve 19a for cooling, and opens the opening/closing valve 21a for the battery.

In this way, in the interior-cooling and device-cooling operation mode, the refrigeration cycle device 10 allows the refrigerant to flow through the refrigerant flow path as indicated by thick arrows of FIG. 1.

With the above structure of the refrigerant flow path, the controller is adapted to calculate a target outlet air temperature TAO which is a target temperature of air to be blown into the vehicle interior, based on the values of the detection signal and operation signal read. Further, the controller determines the operating state of each of various devices for control connected to the output side of the controller, based on the calculated target outlet air temperature TAO and the detection signal from the sensor group.

For example, the refrigerant discharge capacity of the compressor 11, that is, the control signal to be output to the electric motor of the compressor 11 are determined in the following way. First, a target evaporator outlet air temperature TEO of the interior evaporator 20 is determined based on the target air outlet temperature TAO with reference to the control map pre-stored in the controller.

Then, a control signal to be output to the electric motor of the compressor 11 is determined based on a deviation between the target evaporator outlet air temperature TEO and the temperature of blown air from the interior evaporator 20 detected by the evaporator temperature sensor such that the temperature of the air blown from the interior evaporator 20 approaches the target evaporator outlet air temperature TEO by a feedback control method.

The control voltage to be output to the electric motor of the blower 32 is determined based on the target air outlet temperature TAO with reference to a control map pre-stored in the storage circuit. Specifically, the control voltage to be output to the electric motor is maximized in an ultra-low temperature range (maximum cooling range) and ultra-high temperature range (maximum heating range) of the target air outlet temperature TAO, whereby the volume of blown air is controlled to be close to the maximum level. As the target air outlet temperature TAO is increased closer to an intermediate temperature range, the volume of blown air is decreased.

The control signal to be output to the expansion valve 19 for cooling is determined such that a supercooling degree of the refrigerant flowing into the expansion valve 19 for cooling approaches a target supercooling degree that is previously determined so as to bring a coefficient of performance (COP) of the cycle closer to the substantially maximum value.

The control signal to be output to the servo motor of the air mix door 34 is determined using the target air outlet temperature TAO, the blown air temperature Tefin of the interior evaporator 20, and the like such that the temperature of air to be blown into the vehicle interior becomes a passenger's desired temperature set by the vehicle interior temperature setting switch. In an operation mode of cooling the vehicle interior, like the interior-cooling and device-cooling operation mode, the air mix door 34 may be operated so as to close the air passage on a side of the interior condenser 13.

The control signal to be output to the expansion valve 21 for the battery is determined such that a throttle opening of the expansion valve 21 for the battery is a predetermined throttle opening. The control signal to be output to the blower 52 of the battery pack 50 is determined such that a blowing capacity of the blower 52 is a predetermined blowing capacity. Then, the control signals or control voltages are output from the controller to the devices to be controlled so as to obtain the control state determined above.

Thus, in the interior-cooling and device-cooling operation mode, the refrigeration cycle device 10 allows the high-pressure refrigerant discharged from the compressor 11 to flow into the interior condenser 13 without branching the refrigerant from the first branch portion 12a into the side of the first three-way valve 14a. The refrigerant flowing into the interior condenser 13 exchanges heat with the air for the interior having passed through the interior evaporator 20 to dissipate heat therefrom, and then flows out of the interior condenser 13.

The refrigerant having flowed out of the interior condenser 13 flows into the exterior heat exchanger 17 via the first merging portion 12b and the bypass passage 16b because the bypass passage opening/closing valve 16a is open. The refrigerant flowing into the exterior heat exchanger 17 exchanges heat with outside air blown from a blower fan 17a to further dissipate heat therefrom. The refrigerant having flowed from the exterior heat exchanger 17 flows from the side of the second branch portion 12c toward the third branching portion 12d via the check valve 18 because the suction side opening/closing valve 18a is closed.

The refrigerant having flowed from one of the refrigerant outlets of the third branch portion 12d is decompressed by the expansion valve 19 for cooling. The refrigerant decompressed by the expansion valve 19 for cooling flows into the indoor evaporator 20, and absorbs heat from the air for the interior blown from the blower 32 to evaporate itself. In this way, the air for the interior is cooled. The refrigerant having flowed from the interior evaporator 20 flows into the accumulator 23 via the third merging portion 12f, fixed throttle 22, and second merging portion 12e.

The refrigerant having flowed from the other one of the refrigerant outlets of the third branch portion 12d is decompressed by the expansion valve 21 for the battery into a low-pressure refrigerant. The refrigerant having flowed from the expansion valve 21 for the battery flows into the auxiliary heat exchanger 15, and absorbs heat from the air for the battery blown from the blower 52 to evaporate itself.

In this way, the air for the battery is cooled. The refrigerant having flowed from the auxiliary heat exchanger 15 flows into the accumulator 23 via the third merging portion 12f, the fixed throttle 22, and the second merging portion 12e. The gas-phase refrigerant separated by the accumulator 23 is sucked into the compressor 11, and compressed therein again.

As mentioned above, in the interior-cooling and device-cooling operation mode, the air for the interior can be cooled by the interior evaporator 20 to thereby cool the vehicle interior, while the air for the battery can be cooled by the auxiliary heat exchanger 15 to thereby cool the secondary battery 55.

(b) Cooling Operation Mode

The cooling operation mode is an operation mode of cooling the vehicle interior without adjusting the temperature of the secondary battery 55. More specifically, this operation mode is performed with an operation switch of the operation panel turned on (ON) when cooling is selected by the selection switch while the battery temperature Tb is higher than the first reference temperature Tk1, and lower than the second reference temperature Tk2.

In the cooling operation mode, the controller controls the operation of the first three-way valve 14a so as to connect the refrigerant outlet side of the expansion valve 21 for the battery to the refrigerant inlet side of the auxiliary heat exchanger 15. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, opens the opening/closing valve 19a for cooling, and closes the opening/closing valve 21a for the battery.

Figure 2:
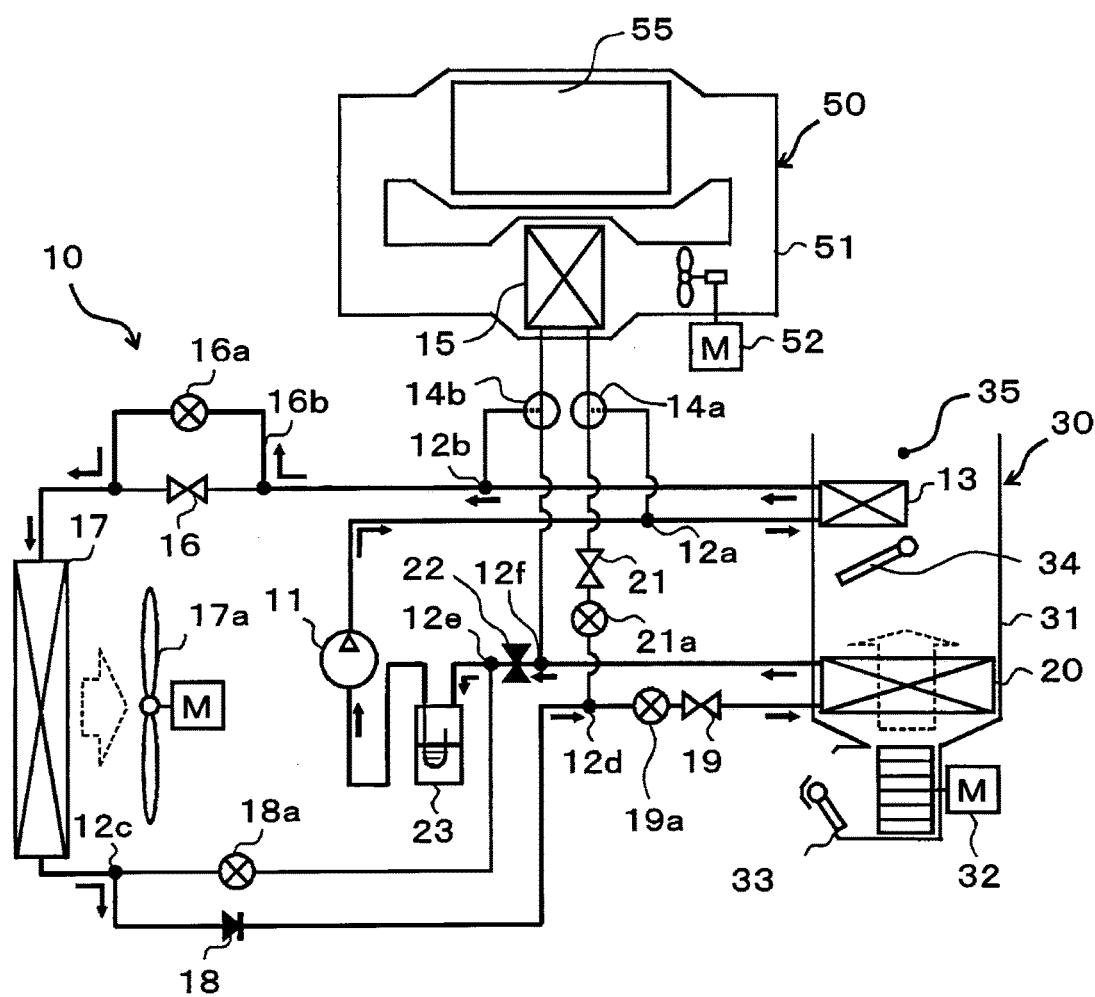
FIG. 2 is an entire configuration diagram showing a refrigerant flow in a cooling operation mode of the refrigeration cycle device in the first embodiment.

In this way, in the cooling operation mode, the refrigeration cycle device 10 performs switching to the refrigerant flow path for allowing the refrigerant to flow therethrough as indicated by thick arrows of FIG. 2. Like the interior-cooling and device-cooling operation mode, the controller controls the operations of the compressor 11, expansion valve 19 for cooling, blower 32, and air mix door 34 to thereby stop the blower 52 of the battery pack 50. The blower 52 may be operated in the same way as the interior-cooling and device-cooling operation mode.

Thus, in the cooling operation mode, the refrigeration cycle device 10 allows the high-pressure refrigerant discharged from the compressor 11 to flow from the interior condenser 13 through the bypass passage 16b and the exterior heat exchanger 17 in that order, like the interior-cooling and device-cooling operation mode. The refrigerant having flowed from the exterior heat exchanger 17 flows into the third branch portion 12d via the second branch portion 12c and the check valve 18 because the suction side opening/closing valve 18a is closed.

The refrigerant flowing into the third branch portion 12d flows toward the expansion valve 19 for cooling without being branched toward the side of the opening/closing valve 21a for the battery because the opening/closing valve 21a for the battery is closed. The refrigerant decompressed by the expansion valve 19 for cooling flows into the interior evaporator 20, and absorbs heat from the air for the interior blown from the blower 32 to evaporate itself. In this way, the air for the interior is cooled.

The refrigerant having flowed from the interior evaporator 20 flows into the accumulator 23 via the third merging portion 12f, fixed throttle 22, and second merging portion 12e. The gas-phase refrigerant separated by the accumulator 23 is sucked into the compressor 11 and compressed therein again.

As mentioned above, in the cooling operation mode, the air for the interior can be cooled by the interior evaporator 20 to thereby cool the vehicle interior.

(c) Device-Cooling Operation Mode

The device-cooling operation mode is an operation mode of cooling the secondary battery 55 without performing air conditioning of the vehicle interior. More specifically, this operation mode is performed with an operation switch of the operation panel turned off (OFF) when the battery temperature Tb is equal to or higher than the second reference temperature Tk2.

In the device-cooling operation mode, the controller controls the operation of the first three-way valve 14a so as to connect the refrigerant outlet side of the expansion valve 21 for the battery to the refrigerant inlet side of the auxiliary heat exchanger 15. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, closes the opening/closing valve 19a for cooling, and opens the opening/closing valve 21a for the battery.

Figure 3:
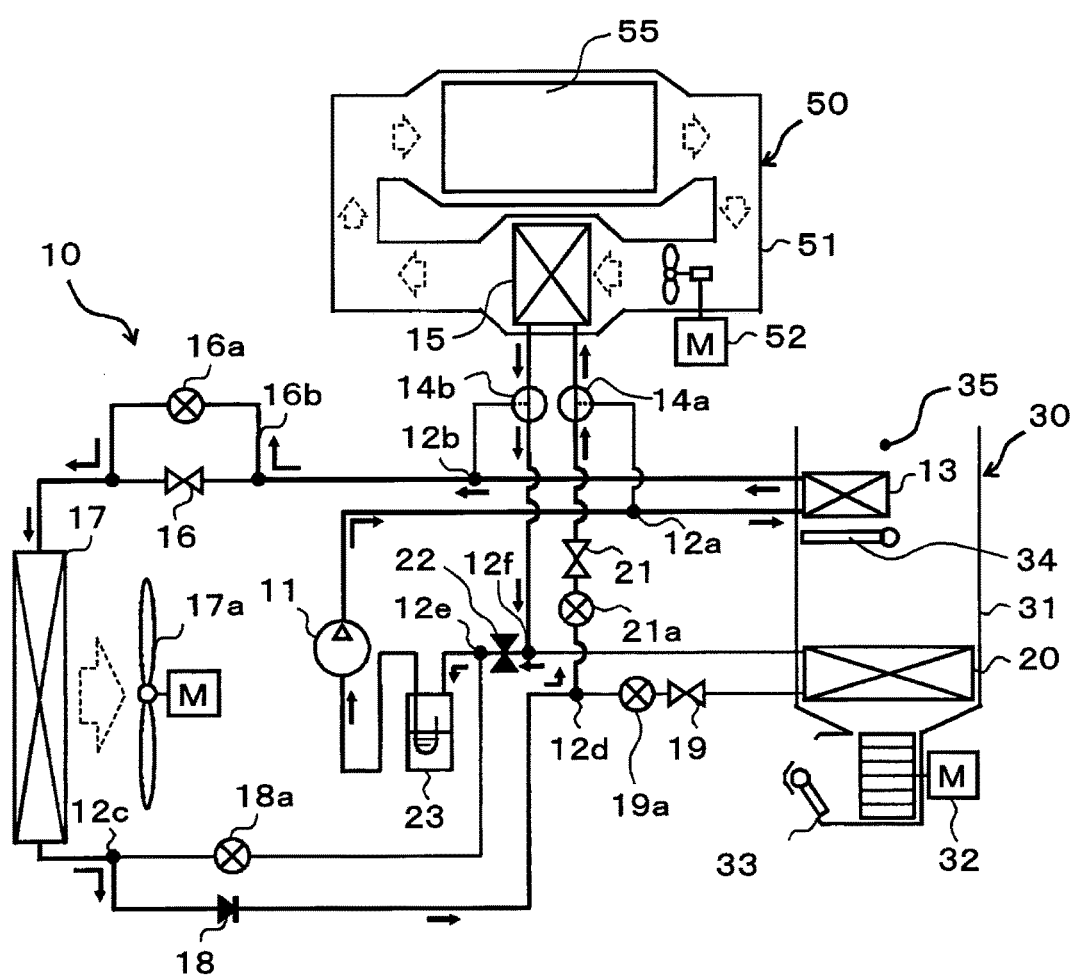
FIG. 3 is an entire configuration diagram showing a refrigerant flow in a device-cooling operation mode of the refrigeration cycle device in the first embodiment.

In this way, in the device-cooling operation mode, the refrigeration cycle device 10 performs switching to the refrigerant flow path for allowing the refrigerant to flow therethrough as indicated by thick arrows of FIG. 3. Further, like the interior-cooling and device-cooling operation mode, the controller controls the operations of the compressor 11, expansion valve 21 for the battery, and the blower 52 of the battery pack 50. The controller stops the blower 32 of the interior air conditioning unit 30, and operates the air mix door 34 such that the air mix door 34 closes the air passage on the side of the interior condenser 13.

Thus, in the device-cooling operation mode, the refrigeration cycle device 10 allows the high-pressure refrigerant discharged from the compressor 11 to flow from the interior condenser 13 through the bypass passage 16b and the exterior heat exchanger 17 in that order, like the interior-cooling and device-cooling operation mode. The refrigerant having flowed from the exterior heat exchanger 17 flows into the third branch portion 12d via the second branch portion 12c and check valve 18 because the suction side opening/closing valve 18a is closed.

The refrigerant flowing into the third branch portion 12d flows toward the expansion valve 21 for the battery without being branched toward the opening/closing valve 19a for cooling because the opening/closing valve 19a for cooling is closed. The refrigerant decompressed by the expansion valve 21 for the battery flows into the auxiliary heat exchanger 15, and absorbs heat from the air for the battery blown from the blower 52 to evaporate itself. In this way, the air for the battery is cooled.

The refrigerant having flowed from the auxiliary heat exchanger 15 flows into the accumulator 23 via the third merging portion 12f, the fixed throttle 22, and the second merging portion 12e. The gas-phase refrigerant separated by the accumulator 23 is sucked into the compressor 11 and compressed again therein.

As mentioned above, in the device-cooling operation mode, the air for the battery can be cooled by the auxiliary heat exchanger 15 to thereby cool the secondary battery 55.

(d) Interior-Heating and Device-Heating Operation Mode

The interior-heating and device-heating operation mode is an operation mode of heating the vehicle interior and also heating the secondary battery 55 at the same time. More specifically, this operation mode is performed with an operation switch of the operation panel turned on (ON) when heating is selected by the selection switch and the battery temperature Tb is equal to or lower than the first reference temperature Tk1.

In the interior-heating and device-heating operation mode, the controller controls the operation of the first three-way valve 14a so as to connect the other refrigerant outlet side of the first branch portion 12a to the refrigerant inlet side of the auxiliary heat exchanger 15. The controller also controls the operation of the second three-way valve 14b so as to connect the refrigerant outlet side of the auxiliary heat exchanger 15 to the other one of the refrigerant inlets of the first merging portion 12b. Further, the controller closes the bypass passage opening/closing valve 16a, opens the suction side opening/closing valve 18a, closes the opening/closing valve 19a for cooling, and closes the opening/closing valve 21a for the battery.

Figure 4:
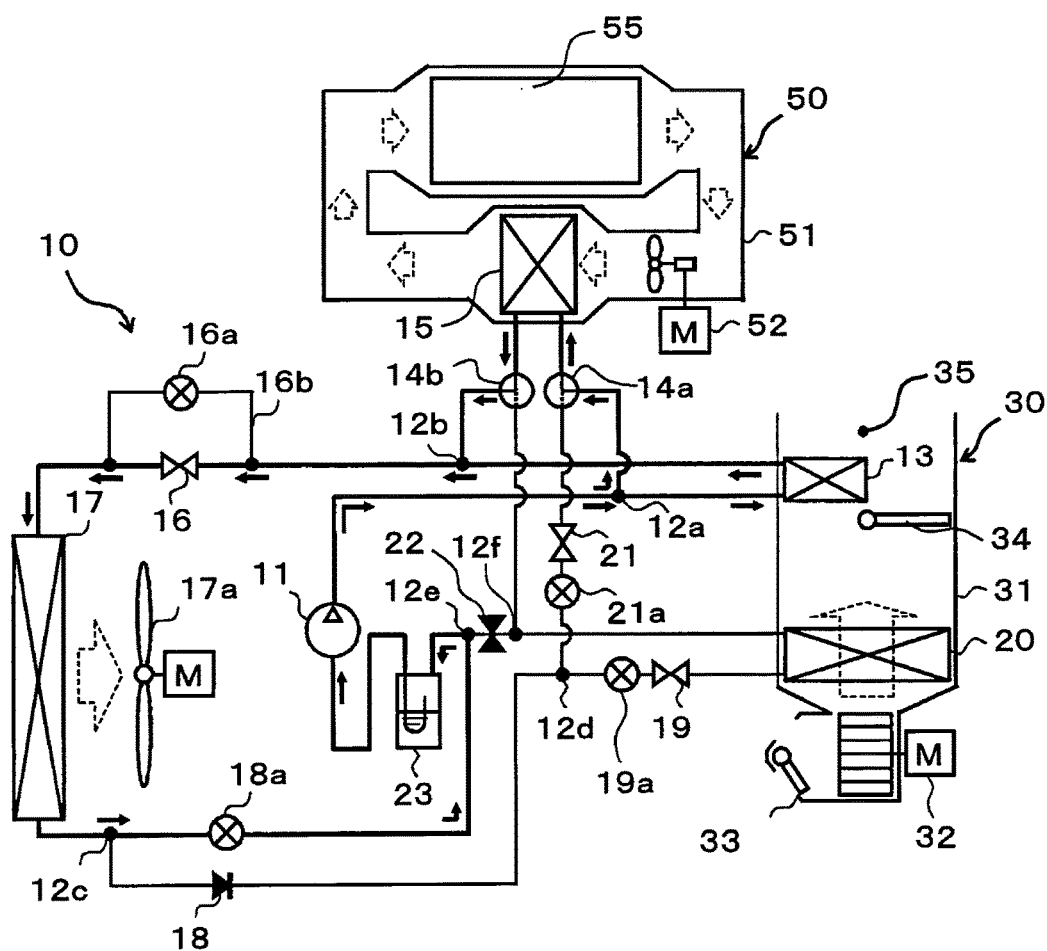
FIG. 4 is an entire configuration diagram showing a refrigerant flow in an interior-heating and device-heating operation mode of the refrigeration cycle device in the first embodiment.

In this way, in the interior-heating and device-heating operation mode, the refrigeration cycle device 10 performs switching the refrigerant flow path through which the refrigerant flows as indicated by thick arrows of FIG. 4. The controller controls the operations of the blower 32 of the interior air conditioning unit 30 and the blower 52 of the battery pack 50 in the same way as the interior-cooling and device-cooling operation mode.

The refrigerant discharge capacity of the compressor 11, that is, the control signal to be output to the electric motor of the compressor 11 is determined such that the blown air temperature TAV detected by the blown air temperature sensor approaches the target air outlet temperature TAO. The target air outlet temperature TAO determined in heating the vehicle interior is in a range of approximately 40 to 60° C.

The control signal to be output to the expansion valve 16 for heating is determined such that a supercooling degree of the refrigerant flowing into the expansion valve 16 for heating approaches a target supercooling degree that is previously determined so as to bring a coefficient of performance (COP) of the cycle closer to the substantially maximum value. The control signal to be output to the servo motor of the air mix door 34 is determined such that the air mix door 34 fully opens the air passage on a side of the interior condenser 13.

Thus, in the interior-heating and device-heating operation mode, the refrigeration cycle device 10 allows the flow of high-pressure refrigerant discharged from the compressor 11 to be branched at the first branch portion 12a. The refrigerant flowing out of one refrigerant outlet of the first branch portion 12a flows into the interior condenser 13, and exchanges heat with the air for the interior to dissipate the heat therefrom. In this way, the air for the interior is heated. The refrigerant having flowed from the interior condenser 13 flows into one of the refrigerant inlets of the first merging portion 12b.

The refrigerant flowing out of the other refrigerant outlet of the first branch portion 12a flows into the auxiliary heat exchanger 15 via the first three-way valve 14a, and exchanges heat with the air for the battery to dissipate the heat therefrom. In this way, the air for the battery is heated. The refrigerant flowing out of the auxiliary heat exchanger 15 flows into the other refrigerant inlet of the first merging portion 12b to be mixed with the refrigerant having flowed from the interior condenser 13.

The refrigerant having flowed from the first merging portion 12b flows into the expansion valve 16 for heating to be decompressed because the bypass passage opening/closing expansion valve 16a is closed. The refrigerant decompressed by the expansion valve 16 for heating flows into the exterior heat exchanger 17, and absorbs heat from the outside air blown from the blower fan 17a to be evaporate itself.

With the suction side opening/closing valve 18a opened, the opening/closing valve 19a for cooling closed, and the opening/closing valve 21a for the battery closed, the refrigerant having flowed from the exterior heat exchanger 17 flows into the accumulator 23 via the second merging portion 12e. The gas-phase refrigerant separated by the accumulator 23 is sucked into the compressor 11 and compressed therein again.

As mentioned above, in the interior-heating and device-heating operation mode, the air for the interior can be heated by the interior evaporator 13 to thereby heat the vehicle interior, while the air for the battery can be heated by the auxiliary heat exchanger 15 to thereby heat the secondary battery 55.

(e) Heating Operation Mode

The heating operation mode is an operation mode of heating the vehicle interior without adjusting the temperature of the secondary battery 55. More specifically, this operation mode is performed with an operation switch of the operation panel turned on (ON) when heating is selected by the selection switch while the battery temperature Tb is higher than the first reference temperature Tk1 and lower than the second reference temperature Tk2.

In the heating operation mode, the controller controls the operation of the first three-way valve 14a so as to connect the refrigerant outlet side of the expansion valve 21 for the battery to the refrigerant inlet side of the auxiliary heat exchanger 15. The controller also controls the operation of the second three-way valve 14b so as to connect the refrigerant outlet side of the auxiliary heat exchanger 15 to one of the refrigerant inlets of the third merging portion 12f. Further, the controller closes the bypass passage opening/closing valve 16a, opens the suction side opening/closing valve 18a, closes the opening/closing valve 19a for cooling, and closes the opening/closing valve 21a for the battery.

Figure 5:
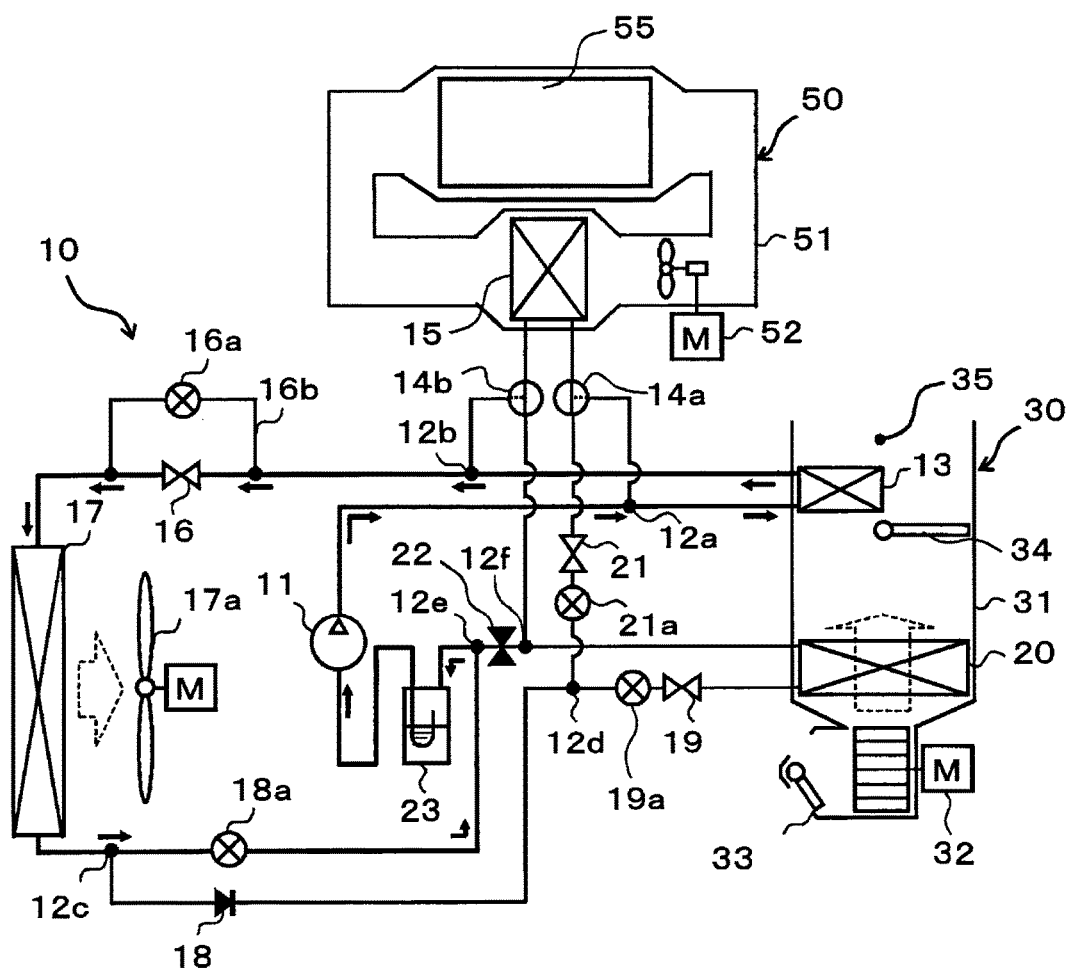
FIG. 5 is an entire configuration diagram showing a refrigerant flow in a heating operation mode of the refrigeration cycle device in the first embodiment.

In this way, in the heating operation mode, the refrigeration cycle device 10 performs switching to the refrigerant flow path for allowing the refrigerant to flow therethrough as indicated by thick arrows of FIG. 5. Like the interior-heating and device-heating operation mode, the controller controls the operations of the compressor 11, expansion valve 16 for heating, blower 32, and air mix door 34 to thereby stop the blower 52 of the battery pack 50. The blower 52 may be operated in the same way as the interior-heating and device-heating operation mode.

Thus, in the heating operation mode, the refrigeration cycle device 10 allows the high-pressure refrigerant discharged from the compressor 11 to flow into the interior condenser 13 without branching the refrigerant from the first branch portion 12a into the first three-way valve 14a. The refrigerant flowing into the interior condenser 13 exchanges heat with the air for the interior to dissipate heat therefrom, and then flows out of the interior condenser 13. In this way, the air for the interior is heated. The operations following this step will be the same as those in the interior-heating and device-heating operation mode.

As mentioned above, in the heating operation mode, the air for the interior can be heated by the interior condenser 13 to thereby heat the vehicle interior.

(f) Device-Heating Operation Mode

The device-heating operation mode is an operation mode of heating the secondary battery 55 without performing air conditioning of the vehicle interior. More specifically, this operation mode is performed with an operation switch of the operation panel turned off (OFF) when the battery temperature Tb is equal to or lower than the first reference temperature Tk1.

In the device-heating operation mode, the controller controls the operations of the refrigerant flow-path switch, compressor 11, expansion valve 16 for heating, and the blower 52 of the battery pack 50, like the interior-heating and device-heating operation mode. The blower 32 of the interior air conditioning unit 30 is stopped, and the control signal to be output to the servo motor of the air mix door 34 is determined such that the air mix door 34 fully closes the air passage on a side of the interior condenser 13.

Figure 6:
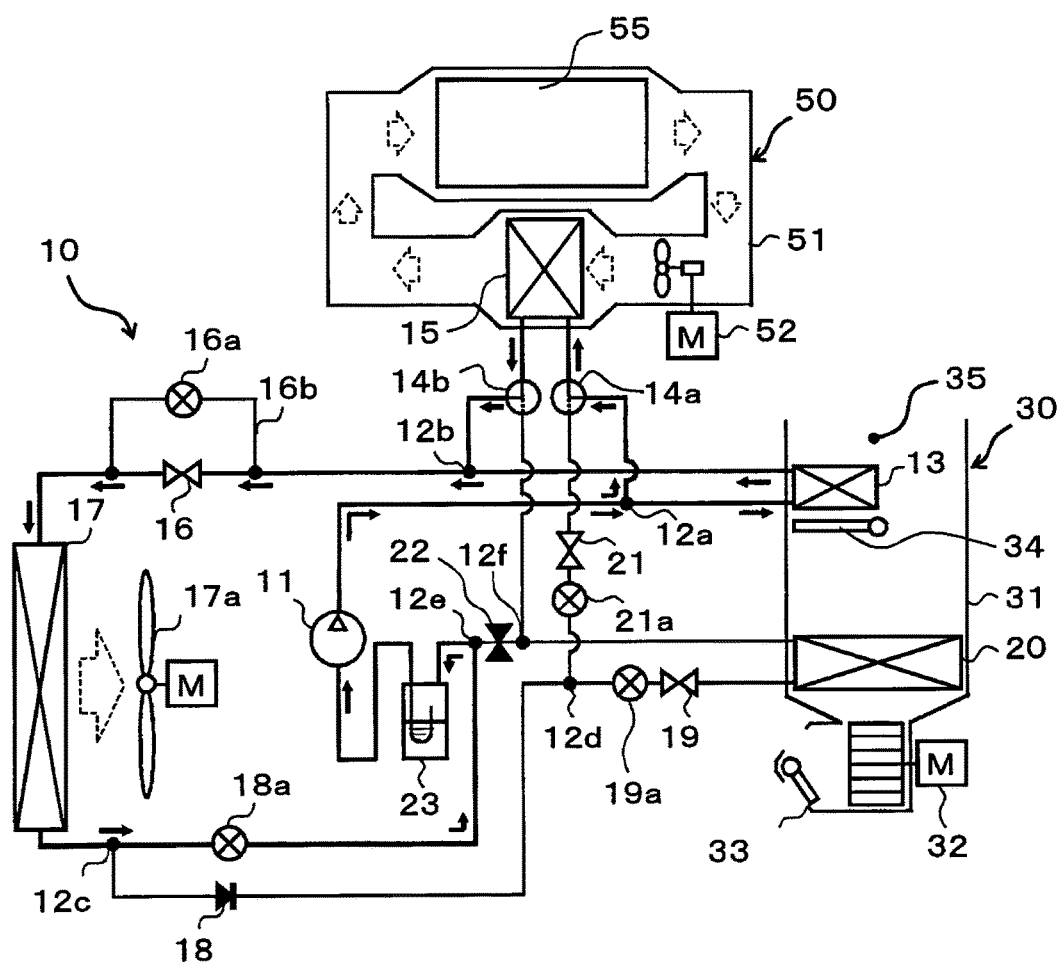
FIG. 6 is an entire configuration diagram showing a refrigerant flow in a device-heating operation mode of the refrigeration cycle device in the first embodiment.

In this way, in the device-heating operation mode, the refrigeration cycle device 10 performs switching to the refrigerant flow path for allowing the refrigerant to flow therethrough as indicated by thick arrows of FIG. 6, so that the refrigerant flows in the same way as the interior-heating and device-heating operation mode. Thus, the refrigerant flowing into the auxiliary heat exchanger 15 exchanges heat with the air for the battery to dissipate heat therefrom, whereby the air for the battery is heated.

However, in the device-heating operation mode, the operation of the blower 32 is stopped, and the air mix door 34 fully closes the air passage on the side of the interior condenser 13, so that the refrigerant flowing into the interior condenser 13 flows out of the interior condenser 13 without exchanging heat with the air for the interior. Thus, the air for the interior is not heated.

As mentioned above, in the device-heating operation mode, the air for the battery can be heated by the auxiliary heat exchanger 15 to thereby heat the secondary battery 55.

(g) Interior-Heating and Device-Cooling Operation Mode

The above-mentioned operation modes (a) to (c) are performed to cool the vehicle interior or the secondary battery 55 when the outside air temperature becomes relatively high, mainly, in summer or the like. The above-mentioned operation modes (d) to (f) are performed to heat the vehicle interior or the secondary battery 55 when the outside air temperature becomes relatively low, mainly, in winter or the like.

In contrast, in spring or autumn, while heating is selected by the selection switch with the operation switch of the operation panel turned on (ON), the self-heating of the secondary battery 55 might increase the battery temperature Tb to the second reference temperature Tk2 or higher. In such a case, the refrigeration cycle device is operated in the interior-heating and device-cooling operation mode.

In the device-cooling operation mode, the controller controls the operation of the first three-way valve 14a so as to connect the refrigerant outlet side of the expansion valve 21 for the battery to the refrigerant inlet side of the auxiliary heat exchanger 15. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, closes the opening/closing valve 19a for cooling, and opens the opening/closing valve 21a for the battery.

Figure 7:
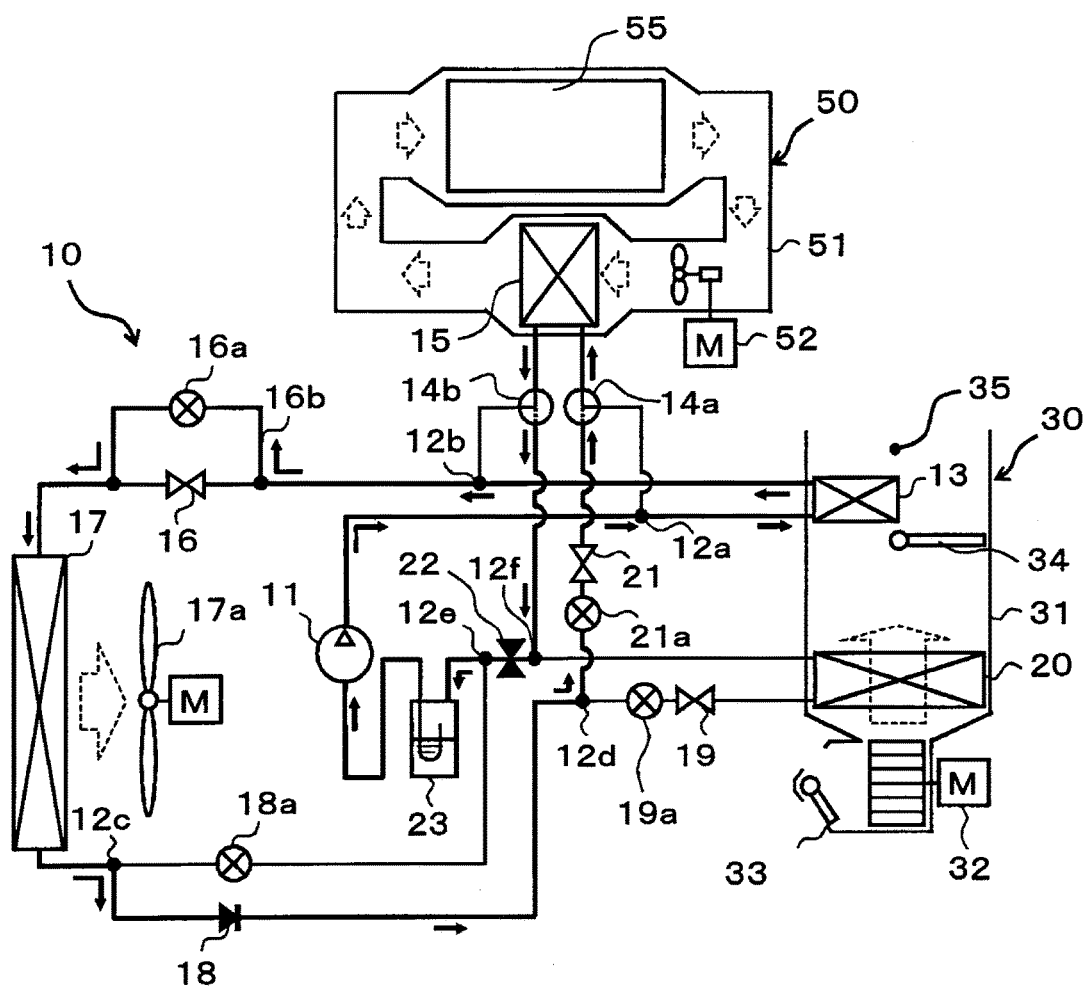
FIG. 7 is an entire configuration diagram showing a refrigerant flow in an interior-heating and device-cooling operation mode of the refrigeration cycle device in the first embodiment.

In this way, in the interior-heating and device-cooling operation mode, the refrigeration cycle device 10 performs switching to the refrigerant flow path for allowing the refrigerant to flow therethrough as indicated by thick arrows of FIG. 7. The controller controls the operations of the compressor 11, blower 32 of the interior air conditioning unit 30 and blower 52 of the battery pack 50 in the same way as the interior-cooling and device-cooling operation mode. The controller also controls the operation of the air mix door in the same way as in the interior-heating and device-heating operation mode. Further, the controller controls the operation of the expansion valve 21 for the battery in the same way as the device-cooling operation mode.

Thus, in the interior-heating and device-cooling operation mode, the refrigeration cycle device 10 allows the high-pressure refrigerant discharged from the compressor 11 to flow into the interior condenser 13 without branching the refrigerant from the first branch portion 12a into the first three-way valve 14a. The refrigerant flowing into the interior condenser 13 exchanges heat with the air for the interior to dissipate heat therefrom, and then flows out of the interior condenser 13. In this way, the air for the interior is heated.

The refrigerant having flowed through the interior condenser 13 flows into the exterior heat exchanger 17 via the bypass passage 16b because the bypass passage opening/closing valve 16a is open, and exchanges heat with the outside air blown from the blower fan 17 to dissipate heat therefrom. The refrigerant having flowed out of the exterior heat exchanger 17 flows from the second branch portion 12c through the check valve 18 and the third branch portion 12d in that order in the same way as the device-cooling operation mode, and then flows into and is decompressed by the expansion valve 21 for the battery.

The refrigerant decompressed by the expansion valve 21 for the battery flows into the auxiliary heat exchanger 15, and absorbs heat from the air for the battery blown from the blower 52 to evaporate itself. In this way, the air for the battery is cooled. The operations following this step will be the same as those in the device-cooling operation mode.

As mentioned above, in the interior-heating and device-cooling operation mode, the air for the interior can be heated by the interior condenser 13 to thereby heat the vehicle interior, while the air for the battery can be cooled by the auxiliary heat exchanger 15 to thereby cool the secondary battery 55.

In the interior-heating and device-cooling operation mode of this embodiment, the controller is adapted to open the bypass passage opening/closing valve 16a and to cause the external heat exchanger 17 to act as the radiator as it has already explained. Alternatively, in the interior-heating and device-cooling mode, the bypass passage opening/closing valve 16a may be closed, and the throttle opening of the expansion valve 16 for heating may be controlled in the same as the above-mentioned interior-heating and device-heating operation mode, whereby the external heat exchanger 17 may function as the evaporator.

In this case, the external heat exchanger 17 functions as the evaporator, which can increase the amount of absorption of the heat in the refrigerant, thereby enhancing the heating capacity of the air for the interior in the interior condenser 13. For example, when the outside air temperature Tam is higher than a predetermined temperature, the exterior heat exchanger 17 functions as the radiator. In contrast, when the outside air temperature Tam is lower than the predetermined temperature, the exterior heat exchanger 17 may function as the evaporator.

In addition to the operation modes (a) to (g) described above, the refrigeration cycle 10 of this embodiment can achieve the interior-cooling and device-heating operation mode in which the vehicle interior is cooled and the secondary battery 55 is heated at the same time. Since such cooling of the vehicle interior is performed when the outside air temperature is relatively high in summer, the secondary battery 55 is less likely to have its temperature that is equal to or lower than the first reference temperature Tk1. Therefore, the operation in the interior-cooling and device-heating operation mode is unlikely to be performed.

In the interior-cooling and device-heating operation mode, the controller controls the operation of the first three-way valve 14a so as to connect the other outlet side of the first branch portion 12a to the refrigerant inlet side of the auxiliary heat exchanger 15. The controller also controls the operation of the second three-way valve 14b so as to connect the refrigerant outlet side of the auxiliary heat exchanger 15 to the other one of the refrigerant inlets of the first merging portion 12b. Further, the controller opens the bypass passage opening/closing valve 16a, closes the suction side opening/closing valve 18a, opens the opening/closing valve 19a for cooling, and closes the opening/closing valve 21a for the battery.

The controller controls the operations of the compressor 11, the blower 32 of the interior air conditioning unit 30, the blower 52 of the battery pack 50, and the air mix door 34 in the same way as the interior-cooling and device-cooling operation mode.

Thus, in the interior-cooling and device-heating operation mode, the refrigeration cycle device 10 allows the air for the interior to be cooled by the interior evaporator 20 in the same way as the cooling operation mode, thereby cooling the vehicle interior. Simultaneously, the refrigeration cycle device 10 also allows the air for the battery to be heated by the auxiliary heat exchanger 15 in the same way as the device-heating operation mode, thereby heating the secondary battery 55.

As mentioned above, the refrigeration cycle device 10 of this embodiment is provided with two heat exchangers, namely, the interior condenser 13 and the interior evaporator 20 as the user-side heat exchanger. Thus, the refrigeration cycle device 10 can heat or cool the air for the interior as the first temperature-adjustment subject, thereby achieving the air conditioning (heating or cooling) of the vehicle interior.

More specifically, as mentioned in the description of the interior-heating and device-heating operation mode, the heating operation mode, and the interior-heating and device-cooling operation mode, the interior condenser 13 constituting the heat exchanger for heat dissipation can exchange heat between the refrigerant discharged from the compressor 11 and the air for the interior, thereby heating the air for the interior.

As mentioned in the description of the interior-cooling and device-cooling operation mode, the interior evaporator 20 constituting the heat exchanger for evaporation can exchange heat between the air for the interior and the refrigerant having flowed from the exterior heat exchanger 17 and decompressed by the expansion valve 19 for cooling, thereby cooling the air for the interior.

Further, the refrigerant flow-path switch can perform switching to the appropriate refrigerant flow path, thereby heating or cooling the air for the battery as the second temperature-adjustment subject to achieve the temperature adjustment of the secondary battery 55.

In more detail, like the interior-heating and device-heating operation mode and the device-heating operation mode, the refrigerant flow-path switch performs switching to the refrigerant flow path (first refrigerant flow path). In the flow path, the refrigerant in a range leading from the discharge port side of the compressor 11 to the inlet side of the exterior heat exchanger 17 (specifically, to the inlet side of the interior condenser 13) flows into the auxiliary heat exchanger 15, while the refrigerant having flowed from the auxiliary heat exchanger 15 is guided to the inlet side of the exterior heat exchanger 17. Thus, the refrigerant discharged from the compressor 11 can exchange heat with the air for the battery to thereby heat the air for the battery.

Like the interior-cooling and device-cooling operation mode, the device-cooling operation mode, and the interior-heating and device-cooling operation mode, the refrigerant flow-path switch performs switching to the refrigerant flow path (second refrigerant flow path). In the flow path, the refrigerant in a range leading from the outlet side of the exterior heat exchanger 17 to the suction port side of the compressor 11 (specifically, on the inlet side of the interior evaporator 20) is decompressed by the expansion valve 21 for the battery to flow into the auxiliary heat exchanger 15, while the refrigerant having flowed from the auxiliary heat exchanger 15 is guided to the suction port side of the compressor 11. Thus, the refrigerant discharged from the exterior heat exchanger 17 can exchange heat with the air for the battery to thereby cool the air for the battery.

For this reason, the refrigeration cycle device 10 of this embodiment can adjust the temperatures of a plurality of types of subjects for temperature adjustment, including the air for the interior (first temperature-adjustment subject) and the air for the battery (second temperature-adjustment subject). In this case, this embodiment can use only one common auxiliary heat exchanger 15 to cool or heat the air for the battery. As a result, this embodiment can reduce a space for mounting the auxiliary heat exchanger 15 as compared to the structure for cooling or heating the air for the battery using a plurality of heat exchangers. Moreover, this embodiment can reduce the size and cost of the entire refrigeration cycle device 10.

Furthermore, this embodiment can have such a structure that guides the low-temperature or high-temperature refrigerant to the one common auxiliary heat exchanger 15, thereby simplifying the entire structure of the refrigeration cycle device as compared to the structure for guiding the low-temperature or high-temperature refrigerant to the respective heat exchangers. As a result, this embodiment can improve the mountability of the refrigeration cycle device on a product.

The refrigeration cycle device 10 of this embodiment is adapted to heat any of the subjects for temperature adjustment by a heat pump cycle (vapor compression refrigeration cycle), and thus can improve an energy efficiency as compared to the case where the subjects for temperature adjustment are heated by an electric heater and the hot gas cycle.

Even though the refrigerant flow-path switch in the refrigeration cycle device 10 of this embodiment switches between the first refrigerant flow path (see FIGS. 4 and 6) and the second refrigerant flow path (see FIGS. 1, 3, and 7), the refrigerant inlet side and outlet side of the auxiliary heat exchanger 15 do not change with respect to each other. In other words, the flow direction of the refrigerant in the auxiliary heat exchanger 15 provided when the refrigerant flow-path switch performs switching to the first refrigerant flow path is the same as that of the refrigerant in the auxiliary heat exchanger 15 provided when the refrigerant flow-path switch performs switching to the second refrigerant flow path. Thus, the specifications of the auxiliary heat exchanger 15 can be easily optimized.

When the refrigerant flow-path switch performs switching to the first refrigerant flow path in the refrigeration cycle device 10 of this embodiment, like the interior-heating and device-heating operation mode and the device-heating operation mode, the refrigerant in a range from the discharge port side of the compressor 11 to the inlet side of the interior condenser 13 flows into the auxiliary heat exchanger 15. Then, the refrigerant flowing out of the auxiliary heat exchanger 15 is guided to the inlet side of the exterior heat exchanger 17.

That is, once the refrigerant flow-path switch performs switching to the first refrigerant flow path, the interior condenser 13 and the auxiliary heat exchanger 15 are connected in parallel. Thus, the high-temperature refrigerant directly after being discharged from the compressor 11 can be used to quickly warm up the secondary battery 55.

When the refrigerant flow-path switch performs switching to the second refrigerant flow path in the refrigeration cycle device 10 of this embodiment, like the interior-cooling and device-cooling operation mode, the device-cooling operation mode, and the interior-heating and device-cooling operation mode, the refrigerant in a range from the outlet side of the exterior heat exchanger 17 to the inlet side of the interior evaporator 20 flows into the auxiliary heat exchanger 15. Then, the refrigerant flowing out of the auxiliary heat exchanger 15 is guided to the suction port side of the compressor 11.

That is, once the refrigerant flow-path switch performs switching to the second refrigerant flow path, the interior evaporator 20 and the auxiliary heat exchanger 15 are connected in parallel. Thus, for example, even when switching from the interior-cooling and device-cooling operation mode to the cooling operation mode, the above arrangement can prevent the drastic change in dryness of the refrigerant on the inlet side of the interior evaporator 20, thereby suppressing the deterioration of the air conditioning feeling.

The refrigeration cycle device 10 of this embodiment performs switching to the first refrigerant flow path when the battery temperature Tb is equal to or lower than the first reference temperature Tk1. On the other hand, the refrigeration cycle device 10 performs switching to the second refrigerant flow path when the battery temperature Tb is equal to or higher than the second reference temperature Tk2. This arrangement can easily adjust the temperature of the secondary battery 55 in the predetermined temperature range, while preventing control hunting.

Second Embodiment

This embodiment differs from the first embodiment in connection structures of the first branch portion 12a and the first three-way valve 14a. Specifically, as shown in the entire configuration diagrams of FIGS. 8 to 14, in this embodiment, the first three-way valve 14a is disposed on the refrigerant outlet side of the interior condenser 13. The first branch portion 12a connected to the first three-way valve 14a is disposed in a refrigerant passage for connecting the outlet side of the expansion valve 21 for the battery to the refrigerant inlet side of the auxiliary heat exchanger 15.

Thus, the first three-way valve 14a is adapted to switch between a refrigerant flow path for connecting the refrigerant outlet side of the interior condenser 13 and the refrigerant inlet side of the first branch portion 12a, and another refrigerant flow path for connecting the refrigerant outlet side of the interior condenser 13 and one refrigerant inlet side of the first merging portion 12b. The structures of other components are the same as those in the first embodiment.

The refrigeration cycle device 10 of this embodiment can also perform the air-conditioning of the vehicle interior, and adjust the temperature of the secondary battery 55. The refrigeration cycle device 10 can be operated by switching among the operation modes (a) to (g), like the first embodiment. Now, a description will be given of the operation of each of the operation modes.

(a) Interior-Cooling and Device-Cooling Operation Mode

In the interior-cooling and device-cooling operation mode of this embodiment, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, opens the opening/closing valve 19a for cooling, and opens the opening/closing valve 21a for the battery.

Figure 8:
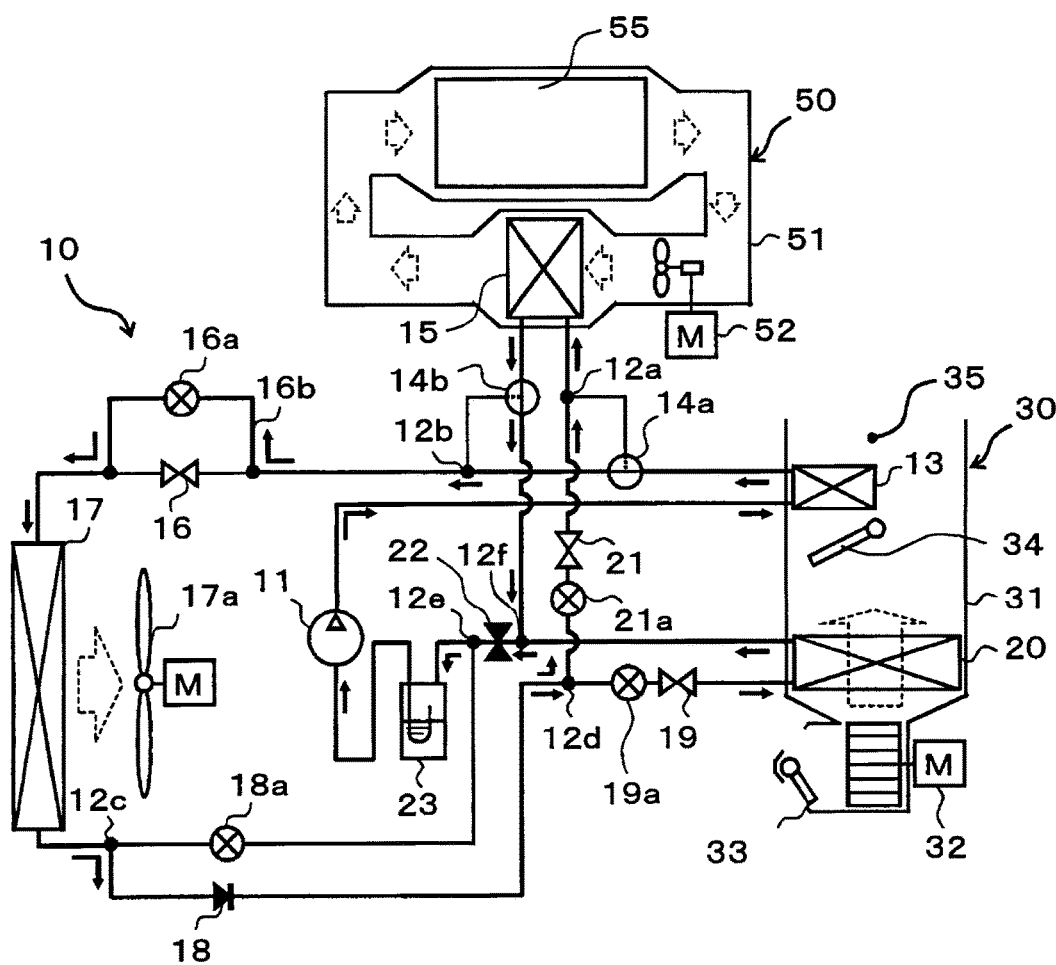
FIG. 8 is an entire configuration diagram showing a refrigerant flow in an interior-cooling and device-cooling operation mode of a refrigeration cycle device according to a second embodiment of the present disclosure.

In this way, in the interior-cooling and device-cooling operation mode, the refrigeration cycle device 10 is switched to the refrigerant flow path for allowing the refrigerant to flow therethrough as indicated by thick arrows of FIG. 8. Thus, the high-pressure refrigerant discharged from the compressor 11 flows into the interior condenser 13 to exchange heat with the air for the interior having passed through the interior evaporator 20, thereby dissipating heat therefrom, and then flows out of the interior condenser 13. The refrigerant having flowed out of the interior condenser 13 flows into the exterior heat exchanger 17 via the first three-way valve 14a, the first merging portion 12b, and the bypass passage 16b. The operations other than those described above are the same as those in the interior-cooling and device-cooling operation mode of the first embodiment.

That is, in the interior-cooling and device-cooling operation mode, the air for the interior can be cooled by the interior evaporator 20 to thereby cool the vehicle interior, while the air for the battery can be cooled by the auxiliary heat exchanger 15 to thereby cool the secondary battery 55.

(b) Cooling Operation Mode

In the cooling operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, opens the opening/closing valve 19a for cooling, and closes the opening/closing valve 21a for the battery.

Figure 9:
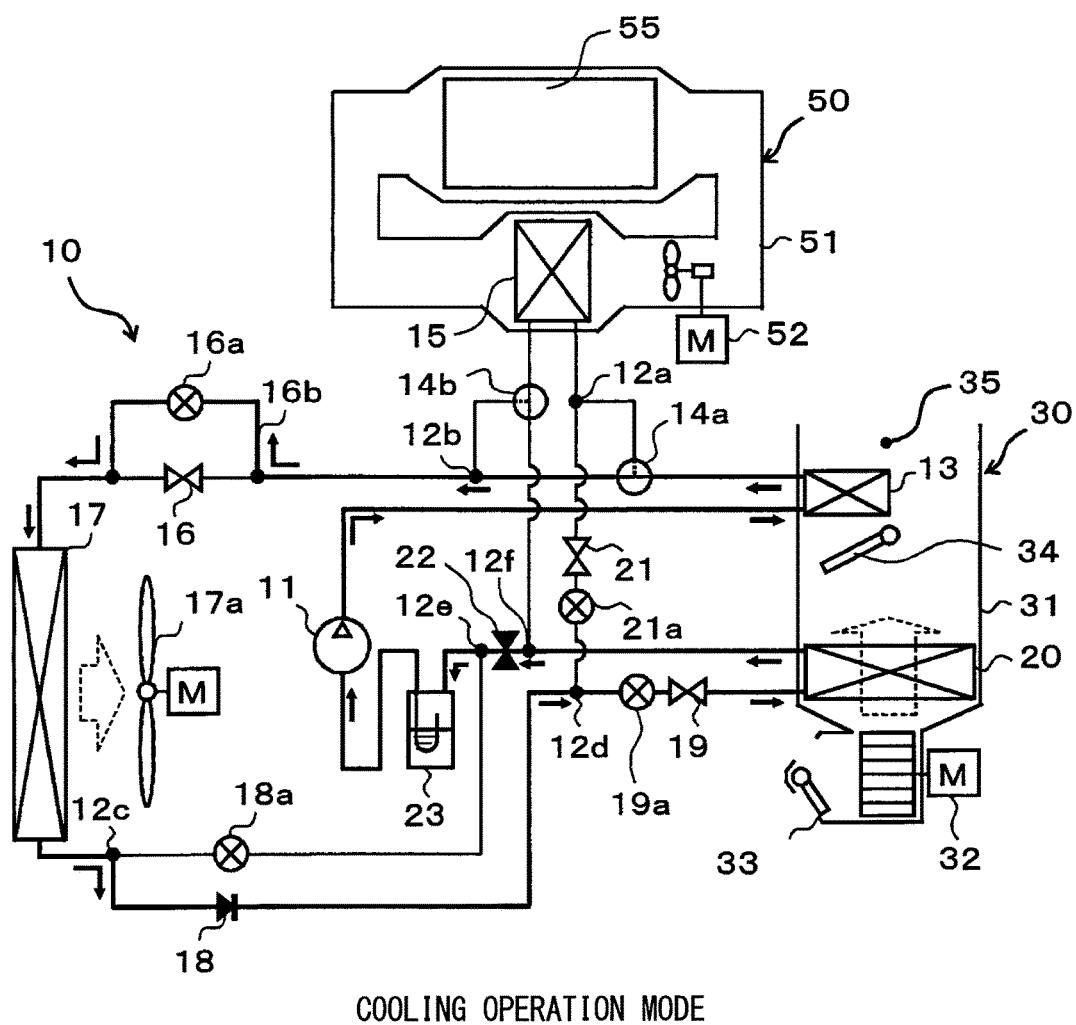
FIG. 9 is an entire configuration diagram showing a refrigerant flow in a cooling operation mode of the refrigeration cycle device in the second embodiment.

In this way, in the cooling operation mode, the refrigeration cycle device 10 performs switching to the refrigerant flow path for allowing the refrigerant to flow therethrough as indicated by thick arrows of FIG. 9. Thus, the high-pressure refrigerant discharged from the compressor 11 flows into the exterior heat exchanger 17 from the interior condenser 13 to the first three-way valve 14a, the first merging portion 12b, and the bypass passage 16b in the same way as the interior-cooling and device-cooling operation mode. The operations other than those described above are the same as those in the cooling operation mode of the first embodiment.

That is, in the cooling operation mode, the air for the interior can be cooled by the interior evaporator 20 to thereby cool the vehicle interior.

(c) Device-Cooling Operation Mode

In the device-cooling operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, closes the opening/closing valve 19a for cooling, and opens the opening/closing valve 21a for the battery.

Figure 10:
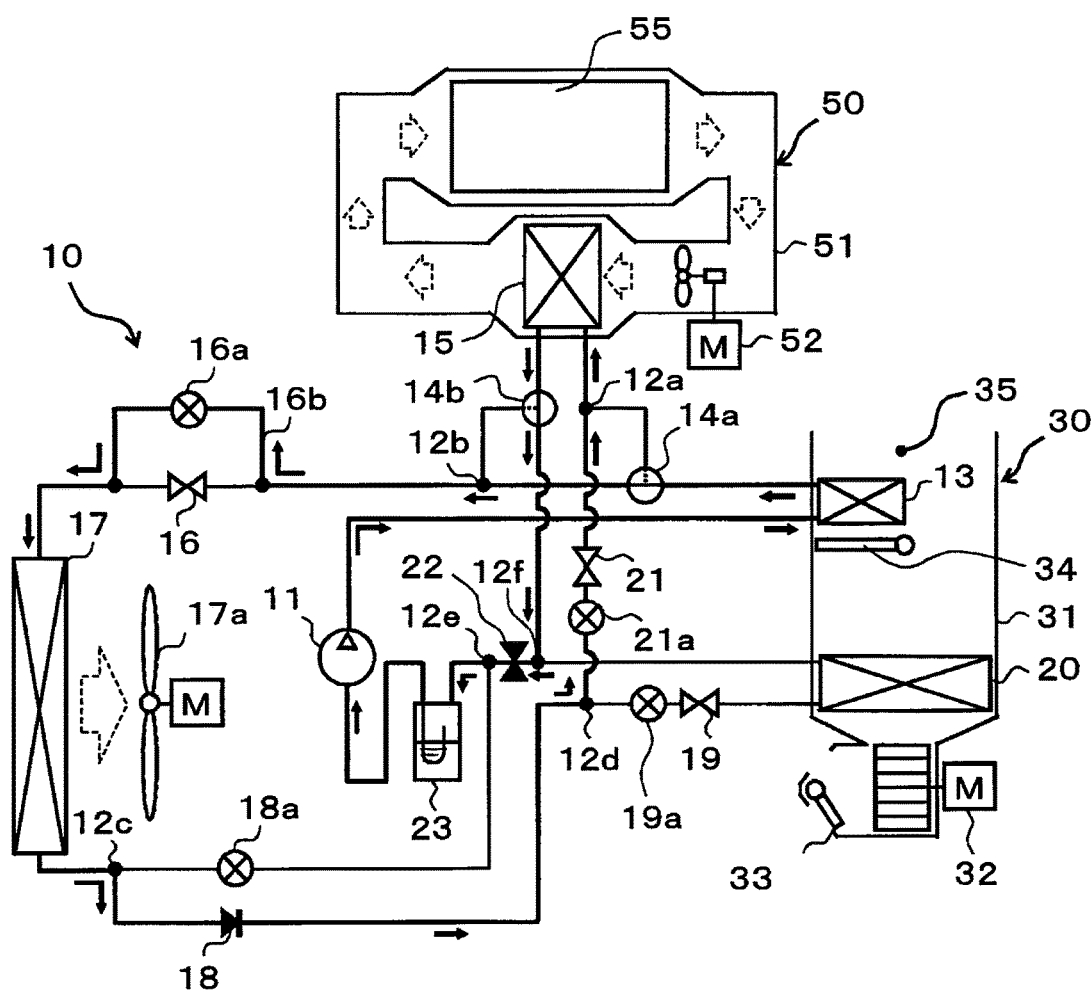
FIG. 10 is an entire configuration diagram showing a refrigerant flow in a device-cooling operation mode of the refrigeration cycle device in the second embodiment.

In this way, in the device-cooling operation mode, the refrigeration cycle device 10 is switched to the refrigerant flow path for allowing the refrigerant to flow therethrough as indicated by thick arrows of FIG. 10. Thus, the high-pressure refrigerant discharged from the compressor 11 flows into the exterior heat exchanger 17 from the interior condenser 13 to the first three-way valve 14a, the first merging portion 12b, and the bypass passage 16b in the same way as the interior-cooling and device-cooling operation mode. The operations other than those described above are the same as those in the device-cooling operation mode of the first embodiment.

That is, in the device-cooling operation mode, the air for the battery can be cooled by the auxiliary heat exchanger 15 to thereby cool the secondary battery 55.

(d) Interior-Heating and Device-Heating Operation Mode

In the interior-heating and device-heating operation mode, the controller controls the operation of the first three-way valve 14a so as to connect the refrigerant outlet side of the interior condenser 13 to the refrigerant inlet side of the first branch portion 12b. The controller also controls the operation of the second three-way valve 14b so as to connect the refrigerant outlet side of the auxiliary heat exchanger 15 to the other one of the refrigerant inlets of the first merging portion 12b. Further, the controller closes the bypass passage opening/closing valve 16a, opens the suction side opening/closing valve 18a, closes the opening/closing valve 19a for cooling, and closes the opening/closing valve 21a for the battery.

Figure 11:
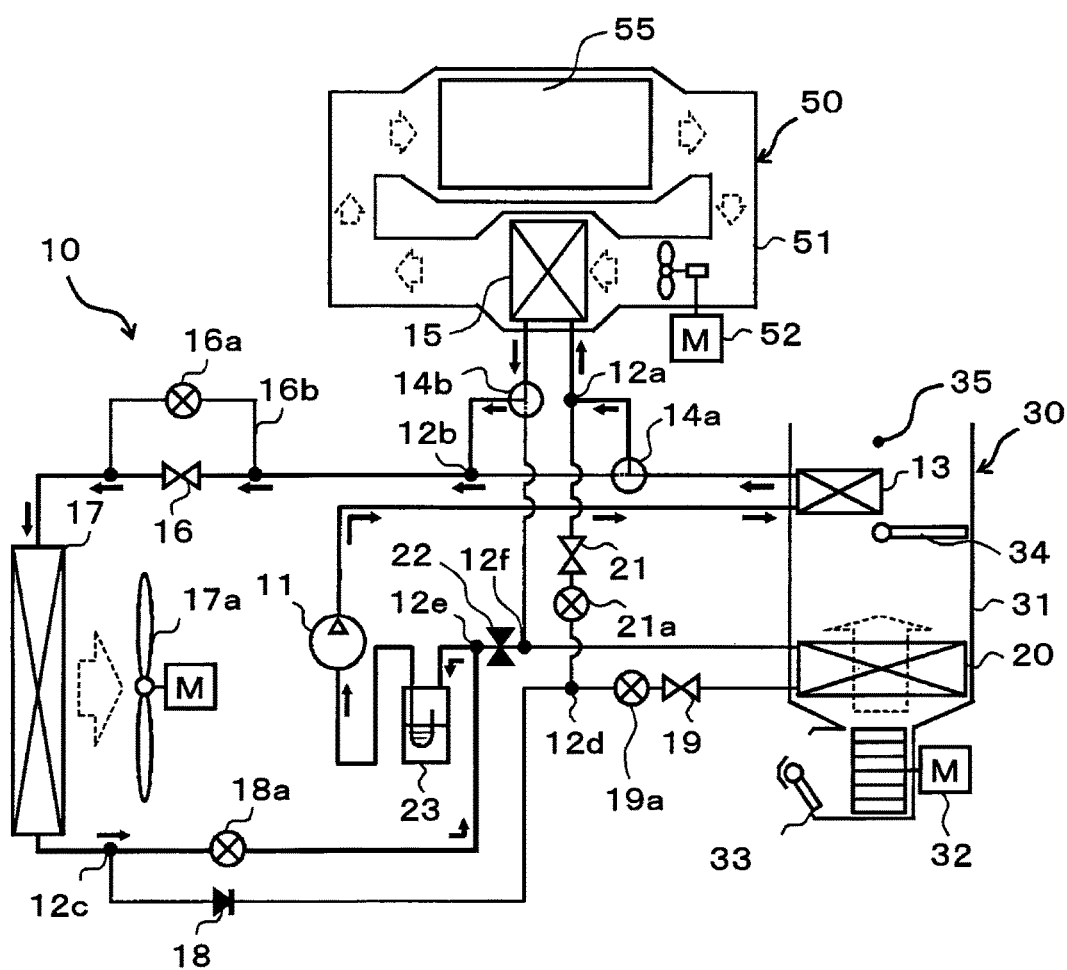
FIG. 11 is an entire configuration diagram showing a refrigerant flow in an interior-heating and device-heating operation mode of the refrigeration cycle device in the second embodiment.

In this way, in the interior-heating and device-heating operation mode, the refrigeration cycle device 10 is switched to the refrigerant flow path for allowing the refrigerant to flow therethrough as indicated by thick arrows of FIG. 11. Thus, the high-pressure refrigerant discharged from the compressor 11 flows into the interior condenser 13 to exchange heat with the air for the interior having passed through the interior evaporator 20, thereby dissipating heat therefrom, and then flows out of the interior condenser 13. The refrigerant having flowed out of the interior condenser 13 flows into the auxiliary heat exchanger 15 via the first three-way valve 14a. The operations other than those described above are the same as those in the interior-heating and device-heating operation mode of the first embodiment.

That is, in the interior-heating and device-heating operation mode, the air for the interior can be heated by the interior condenser 13 to thereby heat the vehicle interior, while the air for the battery can be heated by the auxiliary heat exchanger 15 to thereby heat the secondary battery 55.

(e) Heating Operation Mode

In the heating operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f. Further, the controller closes the bypass passage opening/closing valve 16a, opens the suction side opening/closing valve 18a, closes the opening/closing valve 19a for cooling, and closes the opening/closing valve 21a for the battery.

Figure 12:
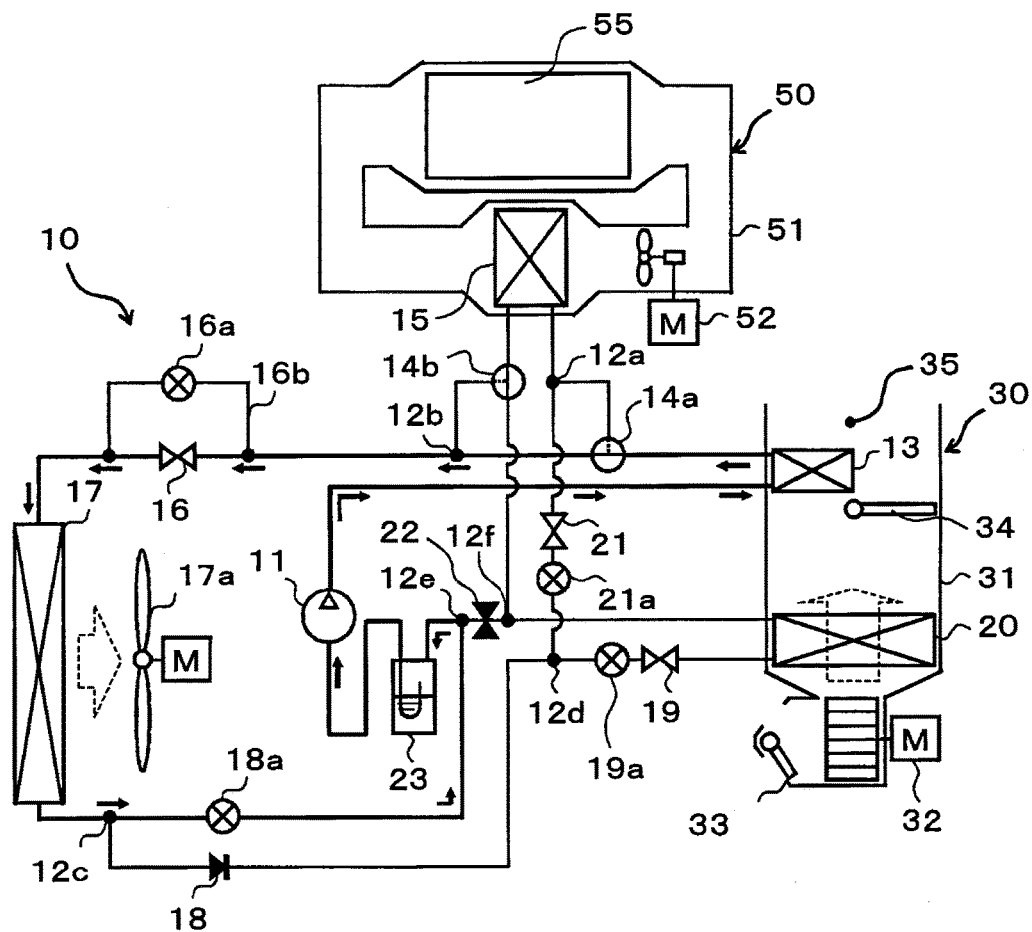
FIG. 12 is an entire configuration diagram showing a refrigerant flow in a heating operation mode of the refrigeration cycle device in the second embodiment.

In this way, in the heating operation mode, the refrigeration cycle device 10 performs switching to the refrigerant flow path for allowing the refrigerant to flow therethrough as indicated by thick arrows of FIG. 12. Thus, the high-pressure refrigerant discharged from the compressor 11 flows into the interior condenser 13 to exchange heat with the air for the interior having passed through the interior evaporator 20, thereby dissipating heat therefrom, and then flows out of the interior condenser 13. The refrigerant having flowed out of the interior condenser 13 is decompressed by the expansion valve 16 for heating to flow into the exterior heat exchanger 17. The operations other than those described above are the same as those in the heating operation mode of the first embodiment.

That is, in the heating operation mode, the air for the interior can be heated by the interior condenser 13 to thereby heat the vehicle interior.

(f) Device-Heating Operation Mode

In the device-heating operation mode, like the air-heating/device heating operation mode, the controller controls the operation of the first three-way valve 14a so as to connect the refrigerant outlet side of the interior condenser 13 to the refrigerant inlet side of the first branch portion 12a. The controller also controls the operation of the second three-way valve 14b so as to connect the refrigerant outlet side of the auxiliary heat exchanger 15 to the other one of the refrigerant inlets of the first merging portion 12b. Further, the controller closes the bypass passage opening/closing valve 16a, opens the suction side opening/closing valve 18a, closes the opening/closing valve 19a for cooling, and closes the opening/closing valve 21a for the battery.

Figure 13:
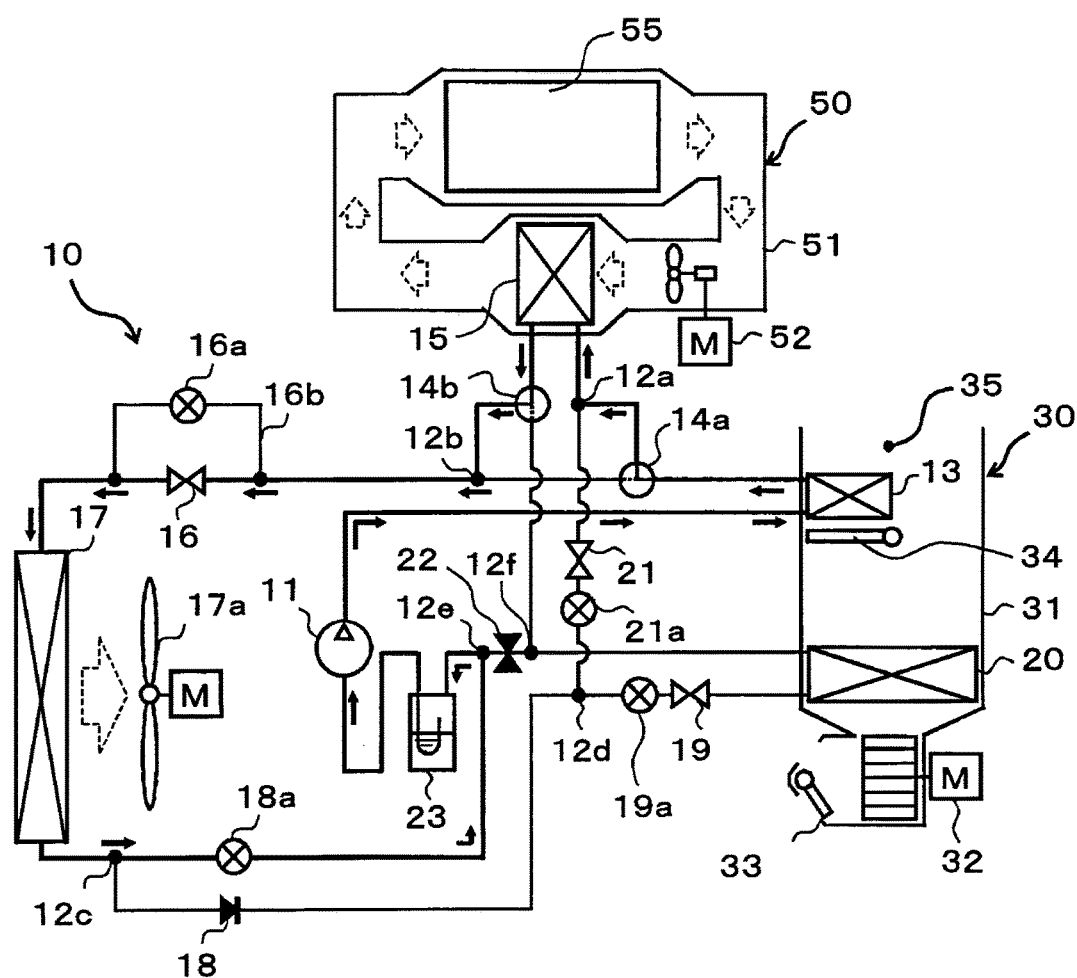
FIG. 13 is an entire configuration diagram showing a refrigerant flow in a device-heating operation mode of the refrigeration cycle device in the second embodiment.

In this way, in the device-heating operation mode, the refrigeration cycle device 10 performs switching to the refrigerant flow path for allowing the refrigerant to flow therethrough as indicated by thick arrows of FIG. 13, so that the refrigerant flows in the exactly same way as the interior-heating and device-heating operation mode. Thus, the refrigerant flowing into the auxiliary heat exchanger 15 exchanges heat with the air for the battery to dissipate heat therefrom, whereby the air for the battery is heated.

In the device-heating operation mode, however, the operation of the blower 32 is stopped, and the air mix door 34 fully closes the air passage on the side of the interior condenser 13, so that the refrigerant flowing into the interior condenser 13 flows out of the interior condenser 13 without exchanging heat with the air for the interior. Thus, the air for the interior is not heated.

(g) Interior-Heating and Device-Cooling Operation Mode

In the interior-heating and device-cooling operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f. Further, the controller opens the bypass passage opening/closing valve 16a, closes the suction side opening/closing valve 18a, closes the opening/closing valve 19a for cooling, and opens the opening/closing valve 21a for the battery.

Figure 14:
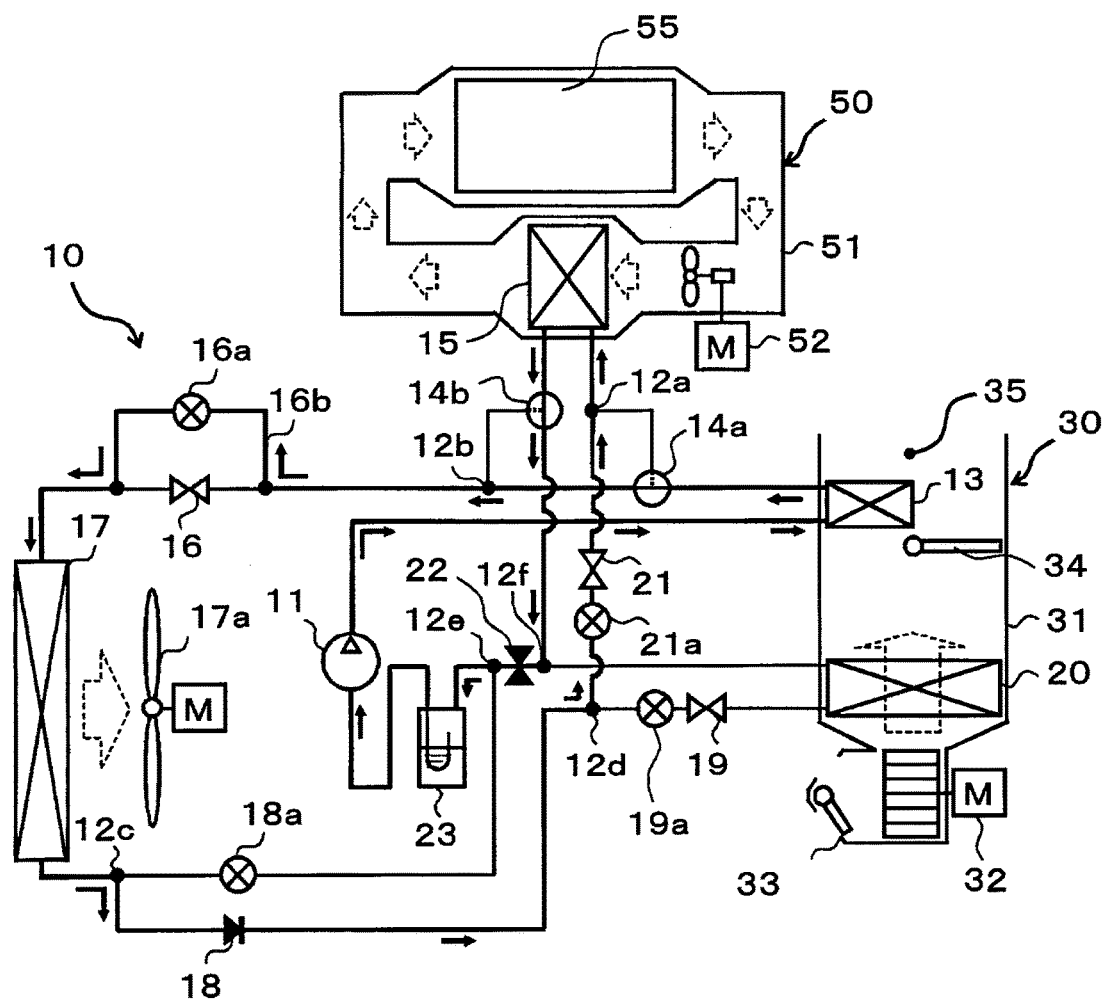
FIG. 14 is an entire configuration diagram showing a refrigerant flow in an interior-heating and device-cooling operation mode of the refrigeration cycle device in the second embodiment.

In this way, in the interior-heating and device-cooling operation mode, the refrigeration cycle device 10 is switched to the refrigerant flow path for allowing the refrigerant to flow therethrough as indicated by thick arrows of FIG. 14. Thus, the high-pressure refrigerant discharged from the compressor 11 flows into the exterior heat exchanger 17 from the interior condenser 13 to the first three-way valve 14a, the first merging portion 12b, and the bypass passage 16b in the same way as the interior-cooling and device-cooling operation mode. The operations other than those described above are the same as those in the interior-heating and device-cooling operation mode of the first embodiment.

That is, in the interior-heating and device-cooling operation mode, the air for the interior can be heated by the interior condenser 13 to thereby heat the vehicle interior, while the air for the battery can be cooled by the auxiliary heat exchanger 15 to thereby cool the secondary battery 55. In addition to the operation modes described above, the refrigeration cycle 10 of this embodiment can also achieve the interior-cooling and device-heating operation mode in which the vehicle interior is cooled and the secondary battery 55 is heated at the same time.

Specifically, in the interior-cooling and device-heating operation mode, the controller controls the operation of the first three-way valve 14a so as to connect the refrigerant outlet side of the interior condenser 13 to the refrigerant inlet side of the first branch portion 12a. The controller also controls the operation of the second three-way valve 14b so as to connect the refrigerant outlet side of the auxiliary heat exchanger 15 to the other one of the refrigerant inlets of the first merging portion 12b. Further, the controller opens the bypass passage opening/closing valve 16a, closes the suction side opening/closing valve 18a, opens the opening/closing valve 19a for cooling, and closes the opening/closing valve 21a for the battery.

As mentioned above, the refrigeration cycle device 10 of this embodiment can heat or cool the air for the interior as the first temperature-adjustment subject, thereby achieving the air-conditioning of the vehicle interior. Further, the refrigeration cycle device can heat or cool the air for the battery as the second temperature adjustment subject, thereby achieving the temperature adjustment of the secondary battery 55. Moreover, the refrigeration cycle device can reduce its size and cost, while simplifying the cycle structure, so that this embodiment can have the same effects as those of the first embodiment.

When the refrigerant flow-path switch performs switching to the first refrigerant flow path in the refrigeration cycle device 10 of this embodiment, like the interior-heating and device-heating operation mode and the device-heating operation mode, the refrigerant in a range from the outlet side of the interior condenser 13 to the inlet side of the exterior heat exchanger 17 flows into the auxiliary heat exchanger 15. Then, the refrigerant flowing out of the auxiliary heat exchanger 15 is guided to the inlet side of the exterior heat exchanger 17.

That is, once the refrigerant flow-path switch performs switching to the first refrigerant flow path, the interior condenser 13 and the auxiliary heat exchanger 15 are connected in series. Thus, the high-pressure refrigerant having a lower temperature as compared to directly after being discharged from the compressor 11 can be used to heat the secondary battery 55. Thus, this arrangement can suppress a drastic increase in temperature of the secondary battery 55. This is effective in the use of the secondary battery 55, which is likely to be broken at a predetermined temperature or more.

Third Embodiment

Figure 15:
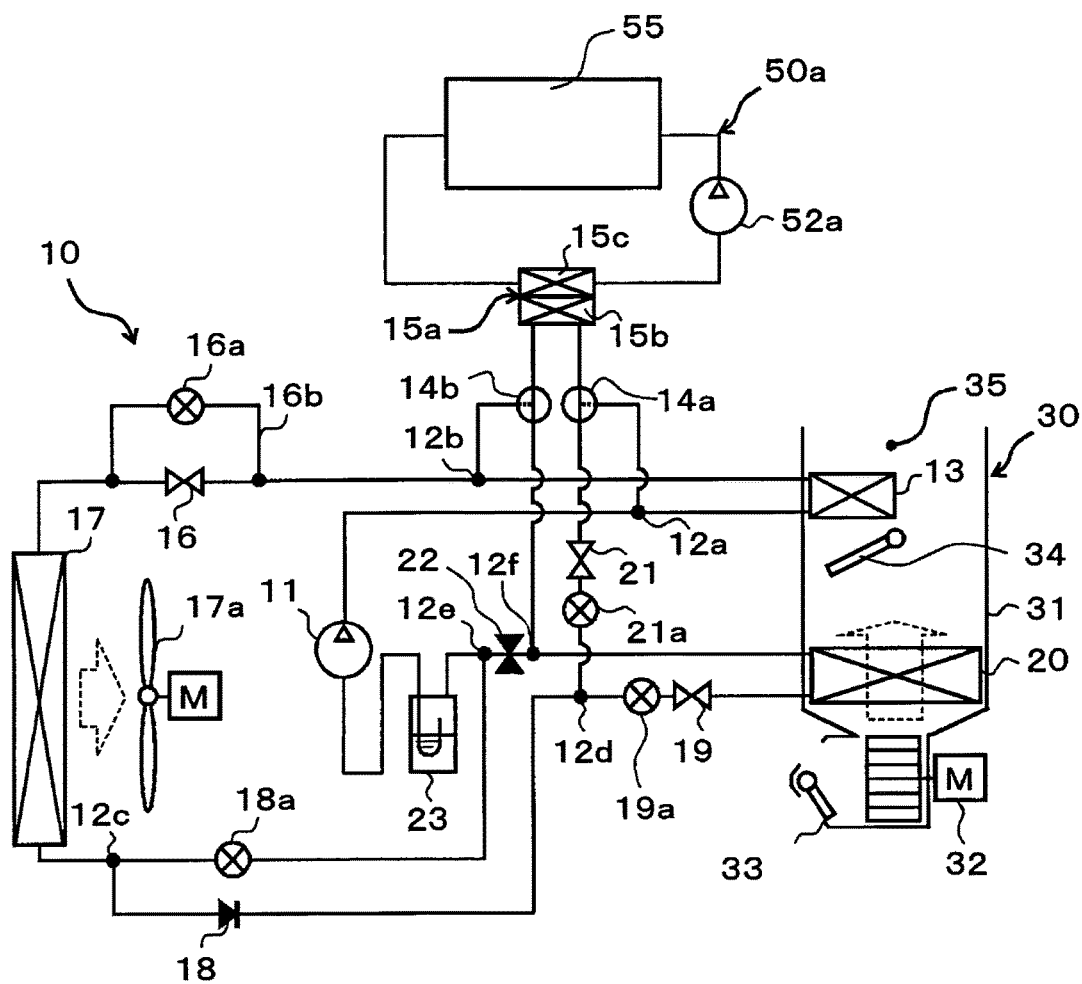
FIG. 15 is an entire configuration diagram of a refrigeration cycle device according to a third embodiment of the present disclosure.

In the first embodiment, the second temperature adjustment subject is air (gas) for the battery that flows through the air passage of the battery pack 50, and is heated or cooled by way of example. On the other hand, in this embodiment, as shown in the entire configuration diagram of FIG. 15, the second temperature adjustment subject may be a heat medium (liquid) flowing through a heat medium circuit 50a by way of example, and may be heated or cooled.

The heat medium circuit 50a is a circuit for allowing circulation of a heat medium (specifically, an ethylene glycol aqueous solution) that adjusts the temperature of the secondary battery 55. In more detail, the heat medium circuit 50a is formed by connecting a water pump 52a for pressure-feeding the heat medium, a heat medium passage formed inside or outside the secondary battery 55, and a water-refrigerant heat exchanger 15a for exchanging heat between the heat medium and the refrigerant by pipes in a ring-like shape in that order.

The water pump 52a is an electric water pump whose operation (heat medium pressure-feeding capacity) is controlled by a control signal output from the controller. More specifically, the water pump 52a also has its operation controlled in the respective operation modes described in the first embodiment, in the same way as the blower 52.

The water-refrigerant heat exchanger 15a is an auxiliary heat exchanger for exchanging heat between the refrigerant flowing through a refrigerant passage 15b and the heat medium flowing through a water passage 15c. Such a water-refrigerant heat exchanger 15a may employ a specific structure in which a pipe forming the water passage 15c is wound around the outer periphery of a refrigerant pipe forming the refrigerant passage 15b to thereby exchange heat between the heat medium and the refrigerant.

Alternatively, another heat exchanger structure may be employed which uses a meandering tube or a plurality of tubes for permitting the flow of refrigerant as the refrigerant passage 15b, thereby forming the water passage 15c in between the adjacent tube parts or tubes. The heat exchanger is provided with corrugated fins or plate fins for promoting the heat exchange between the refrigerant and coolant.

The input side of the controller of this embodiment is connected to a heat medium inlet side temperature sensor for detecting an inlet-side temperature Tin of heat medium that flows into the heat medium passage of the battery 55, and also to a heat-medium outlet side temperature sensor for detecting an outlet-side temperature Tout of heat medium that flows out of the heat medium passage of the battery 55.

In cooling or heating the secondary battery, the water pressure feeding capacity of the water pump 52a is controlled such that a difference between the inlet-side temperature Tin and outlet-side temperature Tout is substantially equal to a predetermined temperature (for example, 5° C.). The structures of other components are the same as those in the first embodiment.

In operation of the refrigeration cycle device 10 of this embodiment in the air-heating/device heating operation mode and the device-heating operation mode, the refrigerant discharged from the compressor 11 flows into the refrigerant passage 15b of the water-refrigerant heat exchanger 15a, so that the heat medium flowing through the water passage 15c can be heated. In this way, the secondary battery 55 can be heated.

In the air-cooling/device cooling operation mode, the device-cooling operation mode, and the interior-heating and device-cooling operation mode, the refrigerant decompressed by the expansion valve 21 for the battery flows into the refrigerant passage 15b of the water-refrigerant heat exchanger 15a, so that the heat medium flowing through the water passage 15c can be cooled. In this way, the secondary battery 55 can be cooled. As a result, even the structure employing the heat medium circuit 50a of this embodiment can obtain the same effects as those of the first embodiment.

Even though the refrigerant flow-path switch in the refrigeration cycle device 10 of this embodiment switches between the first refrigerant flow path and the second refrigerant flow path, the refrigerant inlet side and outlet side of the refrigerant passage 15b of the water-refrigerant heat exchanger 15a do not change with respect to each other.

Accordingly, even after switching the refrigerant flow, the flow of refrigerant in the refrigerant passage 15b can be opposed to the flow of heat medium in the water passage 15c, which can improve a heat exchanging efficiency of the water-refrigerant heat exchanger 15a.

This embodiment uses the heat medium circuit 50a in the refrigerant cycle device 10 of the first embodiment by way of example. Alternatively, this embodiment may use the heat medium circuit 50a in the refrigeration cycle device 10 of the second embodiment in the same way as this embodiment.

Fourth Embodiment

Figure 16:
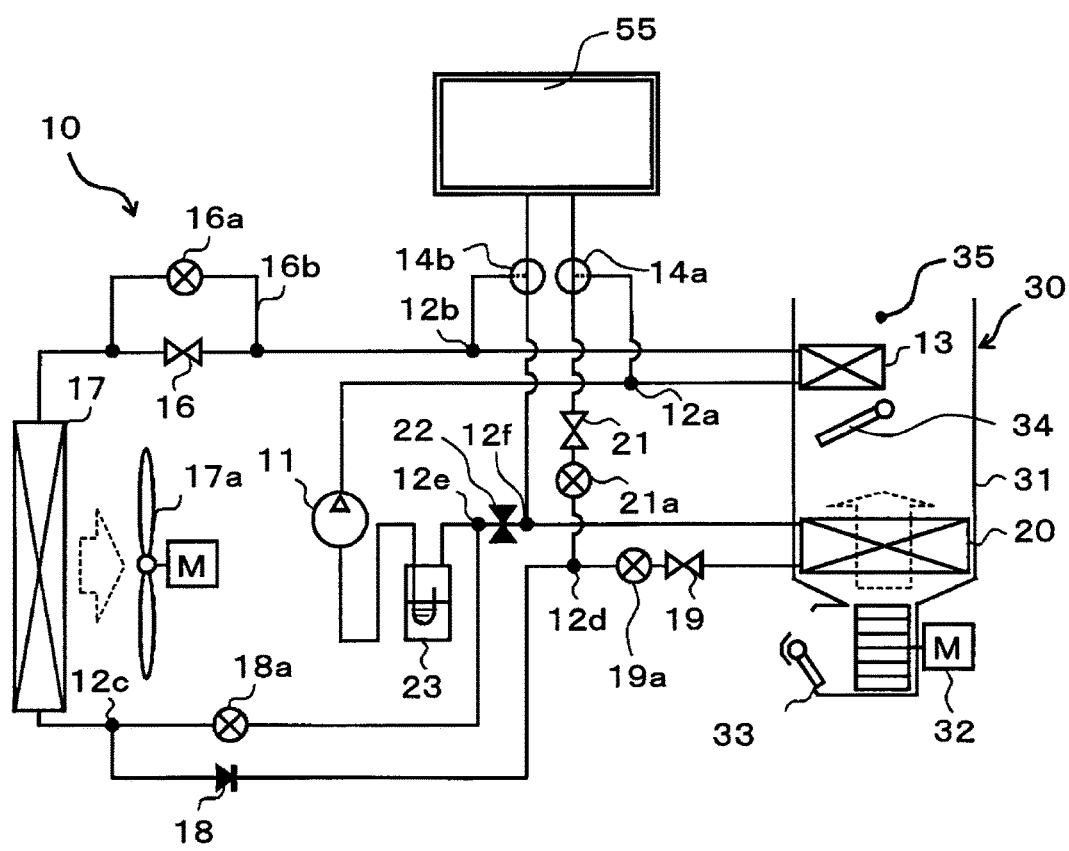
FIG. 16 is an entire configuration diagram of a refrigeration cycle device according to a fourth embodiment of the present disclosure.
Figure 17:
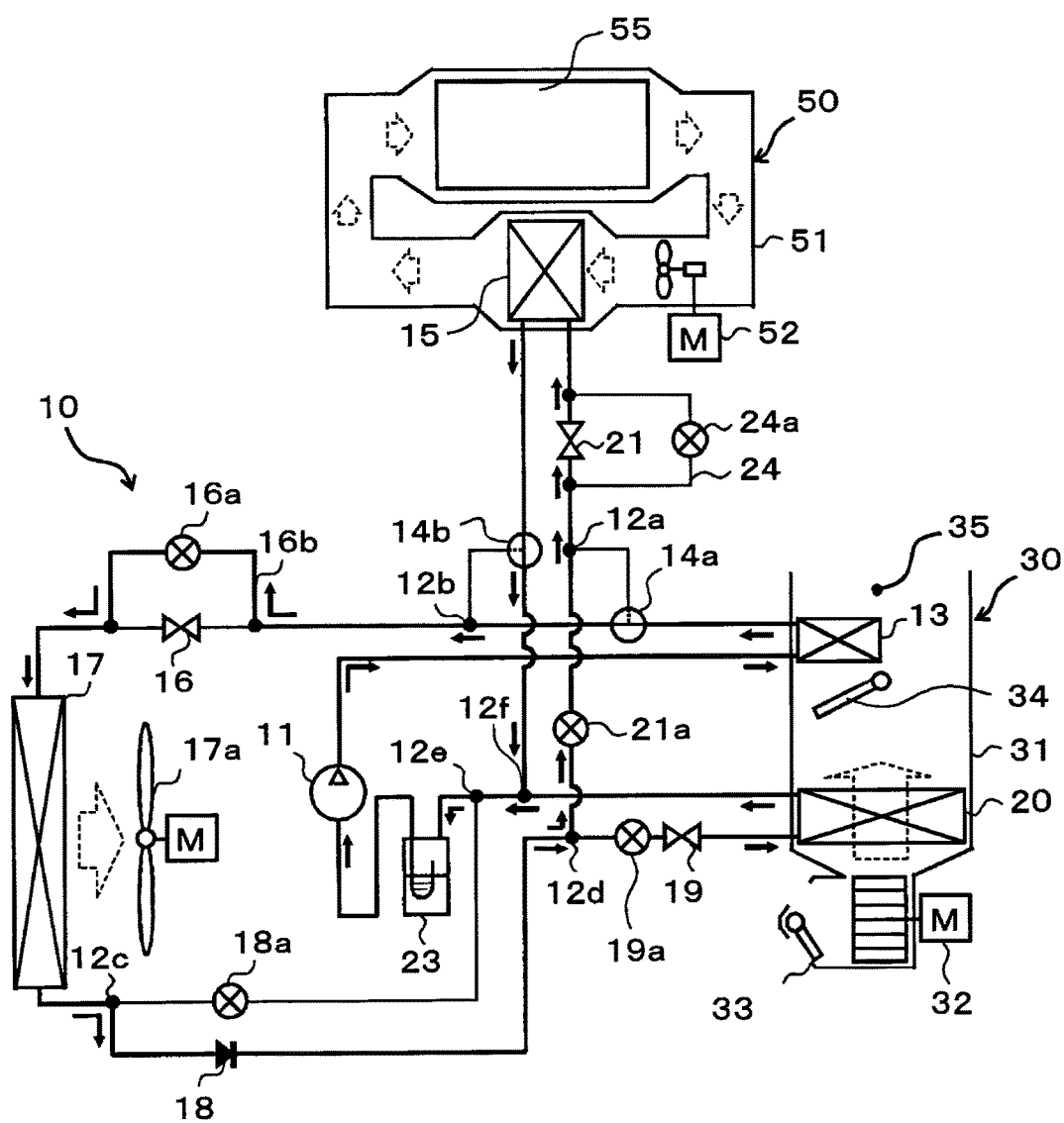
FIG. 17 is an entire configuration diagram showing a refrigerant flow in an interior-cooling and device-cooling operation mode of a refrigeration cycle device according to a fifth embodiment of the present disclosure.
Figure 18:
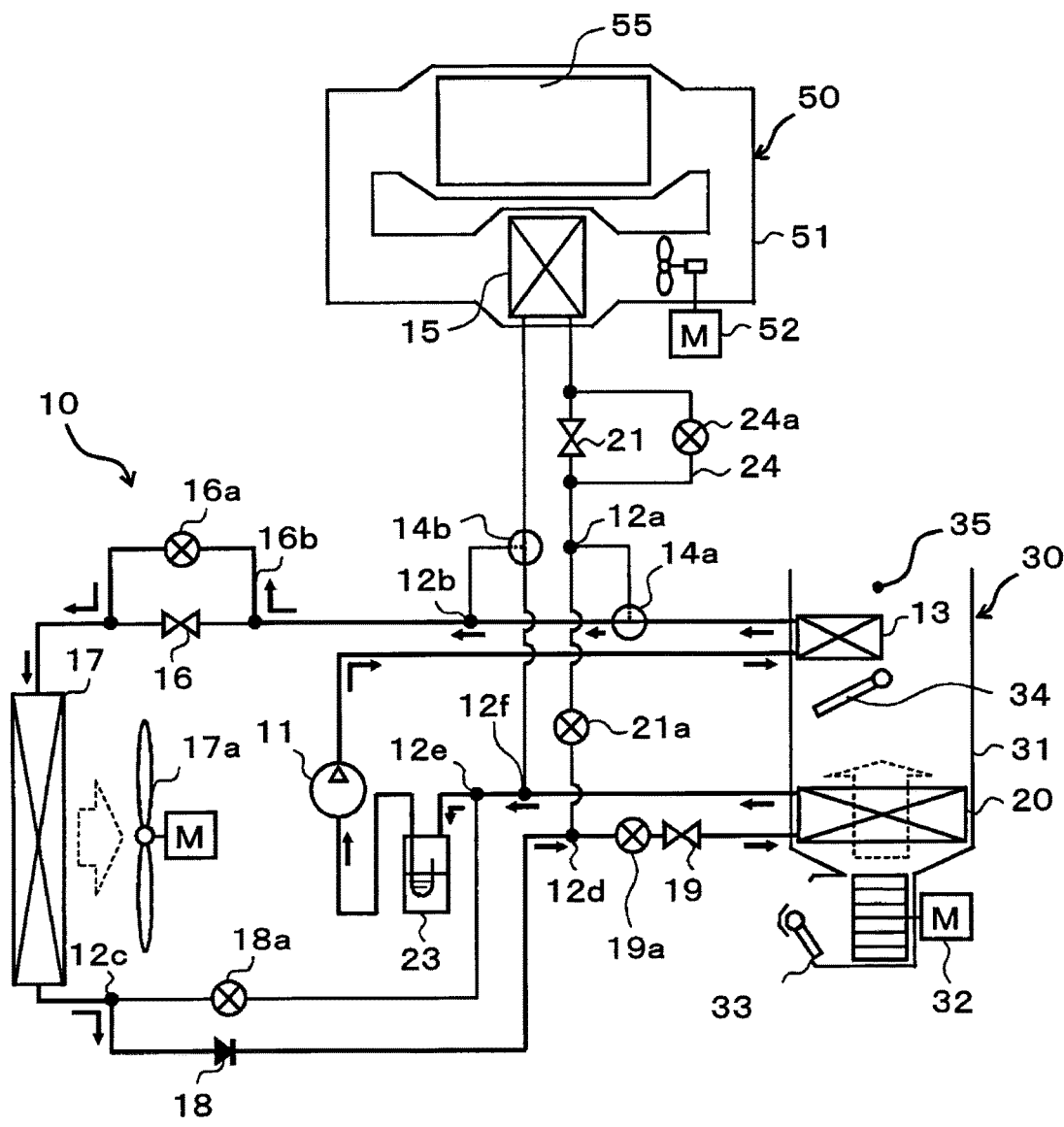
FIG. 18 is an entire configuration diagram showing a refrigerant flow in a cooling operation mode of the refrigeration cycle device in the fifth embodiment.
Figure 19:
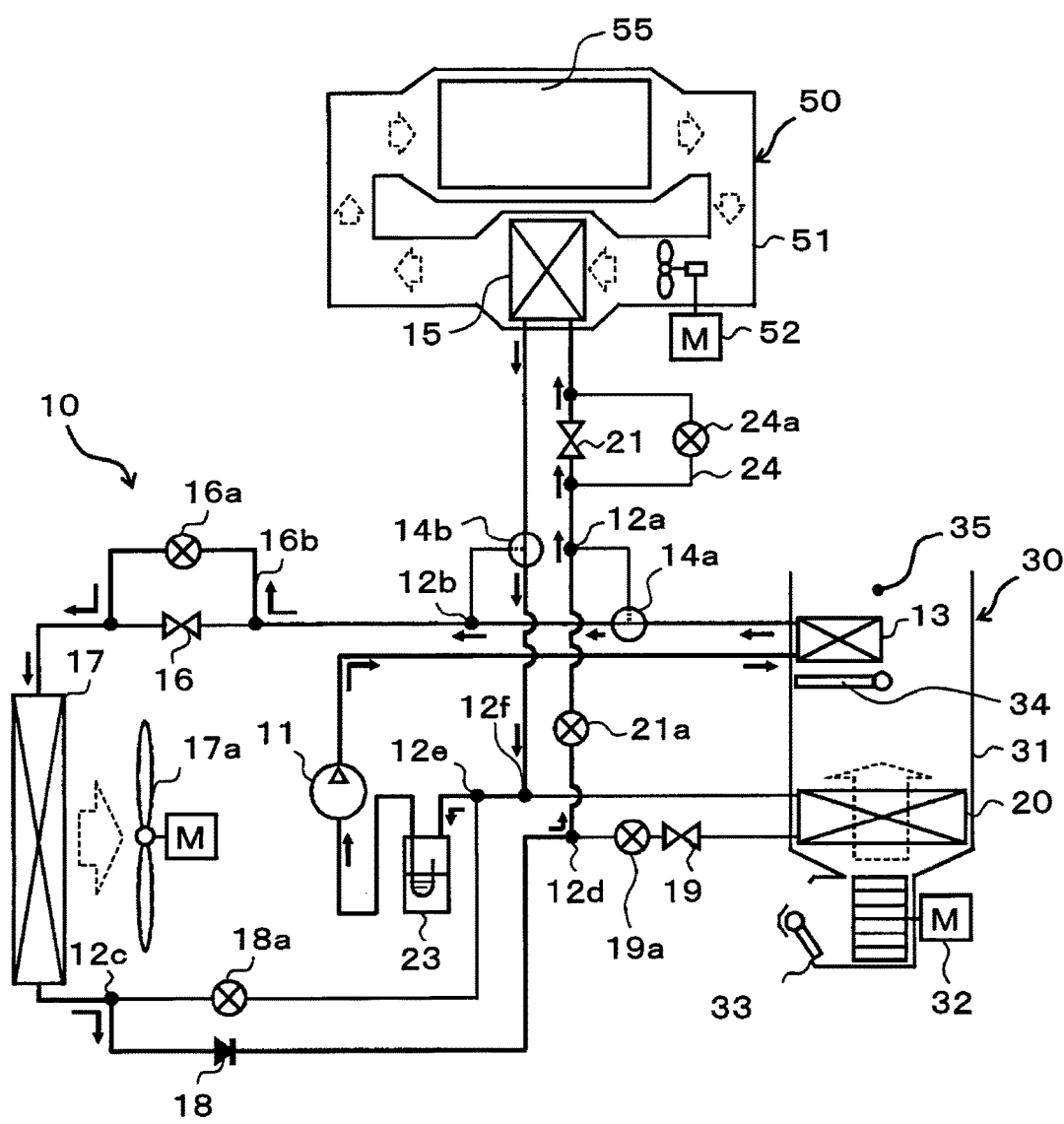
FIG. 19 is an entire configuration diagram showing a refrigerant flow in a device-cooling operation mode of the refrigeration cycle device in the fifth embodiment.
Figure 20:
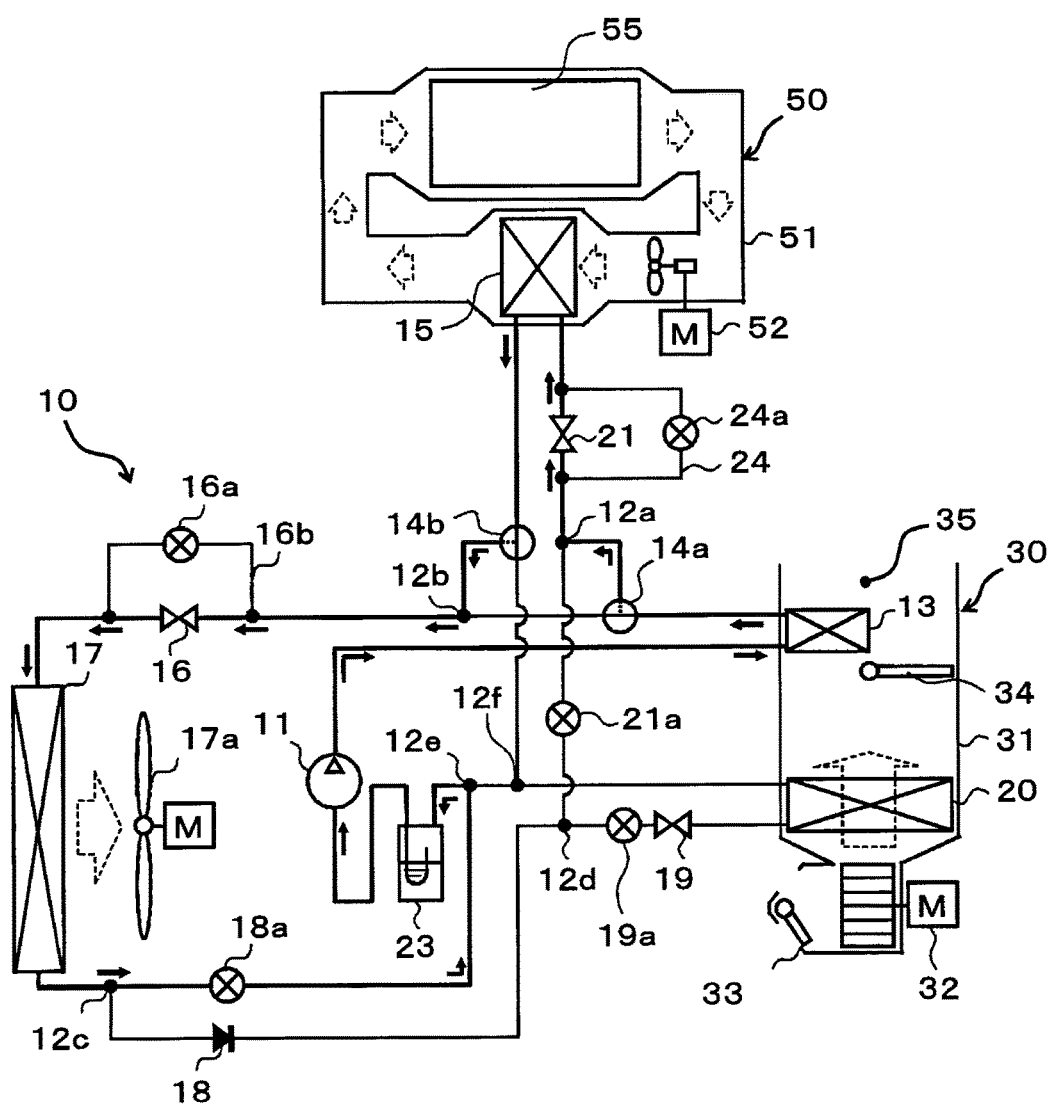
FIG. 20 is an entire configuration diagram showing a refrigerant flow in an interior-heating and device-heating operation mode of the refrigeration cycle device in the fifth embodiment.

Referring to the entire configuration diagram of FIG. 16, this embodiment differs from the first embodiment in that the secondary battery 55 is cooled or heated by the refrigerant having flowed directly from the first three-way valve 14a. In more detail, the refrigerant having flowed out of the first three-way valve 14a flows through the refrigerant passage formed at the outer periphery of the secondary battery 55, and then flows out toward the second three-way valve 14b. Thus, the second temperature-adjustment subject in this embodiment is the secondary battery 55.

The structures and operations of other components are the same as those in the first embodiment. In operation of the refrigeration cycle device 10 of this embodiment in the interior-heating and device-heating operation mode and the device-heating operation mode, the secondary battery 55 can be heated directly by the refrigerant discharged from the compressor 11. In the interior-cooling and device-cooling operation mode, the device-cooling operation mode, and the interior-heating and device-cooling operation mode, the secondary battery 55 can be cooled directly by the refrigerant decompressed by the expansion valve 21 for the battery. As a result, even the structure of this embodiment can obtain the same effects as those of the first embodiment.

This embodiment is adapted to directly cool or heat the secondary battery 55 with the refrigerant having flowed from the first three-way valve 14a in the refrigeration cycle device 10 of the first embodiment. Alternatively, this embodiment may directly cool or heat the secondary battery 55 with the refrigerant having flowed from the first branch portion 12a in the refrigeration cycle device 10 of the second embodiment, in the same way as this embodiment.

Fifth Embodiment

In the above-mentioned second embodiment, when the refrigerant flow-path switch performs switching to the first refrigerant flow path, the interior condenser 13 and the auxiliary heat exchanger 15 are connected in series with respect to the flow of refrigerant by way of example. That is, the interior condenser 13 of the second embodiment uses the high-pressure refrigerant directly discharged from the compressor 11 as a heat source, thereby heating the air for the interior, whereas the auxiliary heat exchanger 15 uses the high-pressure refrigerant having a lower temperature than the refrigerant directly discharged from the compressor 11 as another heat source, thereby heating the air for the battery.

However, a difference in temperature between the air for the interior heated by the interior condenser 13 and the air for the battery heated by the auxiliary heat exchanger 15 is difficult to adjust only by connecting the interior condenser 13 to the auxiliary heat exchanger 15 in series. Here, the temperature of the air for the interior required for heating generally ranges from approximately 40 to 60° C., whereas the battery temperature Tb required for the adequate charge-discharge characteristics of the secondary battery (for example, a lithium ion battery) ranges from approximately 10 to 40° C.

When the temperature of the air for the interior is increased to approximately 60° C. by the interior condenser 13 while the refrigerant flow-path switch performs switching to the first refrigerant flow path, the temperature of the air for the battery is increased to an unnecessarily high level, which might degrade the characteristics of the secondary battery 55. When the battery is intended to be warmed at a battery temperature Tb of approximately 20° C., the air for the interior cannot possibly be increased to a level required for heating.

Referring to the entire configuration diagrams of FIGS. 17 to 23, this embodiment differs from the second embodiment in modification of the arrangement of the expansion valve 21 for the battery, and also in addition of the expansion-valve bypass passage 24 for allowing the refrigerant to bypass the expansion valve 21 for the battery as well as an expansion-valve bypass passage opening/closing valve 24a for opening and closing the expansion-valve bypass passage 24. Although FIGS. 17 to 23 abolish the fixed throttle 22, it is obvious that the fixed throttle 22 may be provided in the same manner as the embodiments described above.

Specifically, the expansion valve 21 for the battery is disposed in a refrigerant passage leading from the refrigerant outlet side of the first branch portion 12a to the refrigerant inlet side of the auxiliary heat exchanger 15. The expansion-valve bypass passage 24 is a refrigerant passage that allows the refrigerant having flowed from the first branch portion 12a to be guided to the refrigerant inlet side of the auxiliary heat exchanger 15, while bypassing the expansion valve 21 for the battery. The expansion-valve bypass passage opening/closing valve 24a is an electromagnetic valve which is substantially the same as the bypass passage opening/closing valve 16a or the like, and thus serves as the refrigerant flow-path switch in this embodiment.

A loss in pressure caused when the refrigerant passes through the expansion-valve bypass passage opening/closing valve 24a is much smaller than that caused when the refrigerant passes through the expansion valve 21 for the battery. Thus, the refrigerant having flowed from the first branch portion 12a flows into the auxiliary heat exchanger 15 without being decompressed when the expansion-valve bypass passage opening/closing valve 24a is open. The structures of other components are the same as those in the second embodiment.

Next, the operation of the refrigeration cycle device 10 with the above-mentioned structure in this embodiment will be described below. The refrigeration cycle device 10 of this embodiment can be operated by switching among the operation modes in the same way as the second embodiment.

(a) Interior-Cooling and Device-Cooling Operation Mode

In the interior-cooling and device-cooling operation mode of this embodiment, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f.

Further, the controller opens the bypass passage opening/closing valve 16a, closes the suction side opening/closing valve 18a, opens the opening/closing valve 19a for cooling, opens the opening/closing valve 21a for the battery, and closes the expansion-valve bypass passage opening/closing valve 24a. In this way, in the interior-cooling and device-cooling operation mode, the refrigeration cycle device 10 is switched to the refrigerant flow path for allowing the refrigerant to flow therethrough as indicated by thick arrows of FIG. 17.

The operations other than those described above are the same as those in the interior-cooling and device-cooling operation mode of the second embodiment. In the interior-cooling and device-cooling operation mode, this embodiment can perform switching to the cycle structure that is substantially the same as that in the interior-cooling and device-cooling operation mode of the second embodiment illustrated in FIG. 8, and therefore can cool the secondary battery 55, while cooling the vehicle interior in the same way as the second embodiment.

(b) Cooling Operation Mode

In the cooling operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f.

Further, the controller opens the bypass passage opening/closing valve 16a, closes the suction side opening/closing valve 18a, opens the opening/closing valve 19a for cooling, and closes the opening/closing valve 21a for the battery. In this way, in the cooling operation mode, the refrigeration cycle device 10 performs switching to the refrigerant flow path for allowing the refrigerant to flow therethrough as indicated by thick arrows of FIG. 18.

Since in the cooling operation mode, the refrigerant is not allowed to flow into the auxiliary heat exchanger 15, the expansion-valve bypass passage opening/closing valve 24a may be open or closed. This embodiment is adapted to maintain the opened/closed states of the respective components in a previous operation mode before switching to the present operation mode.

The operations other than those described above are the same as that in the cooling operation mode of the second embodiment. In the cooling operation mode, this embodiment can perform switching to the cycle structure that is substantially the same as that in the air-cooling operation mode of the second embodiment illustrated in FIG. 9, and therefore can cool the vehicle interior in the same way as the second embodiment.

(c) Device-Cooling Operation Mode

In the device-cooling operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f.

Further, the controller opens the bypass passage opening/closing valve 16a, closes the suction side opening/closing valve 18a, closes the opening/closing valve 19a for cooling, opens the opening/closing valve 21a for the battery, and closes the expansion-valve bypass passage opening/closing valve 24a. In this way, in the device-cooling operation mode, the refrigeration cycle device 10 is switched to the refrigerant flow path for allowing the refrigerant to flow therethrough as indicated by thick arrows of FIG. 19.

The operations other than those described above are the same as those in the device-cooling operation mode of the second embodiment. In the device-cooling operation mode, this embodiment can perform switching to the cycle structure that is substantially the same as that in the device-cooling operation mode of the second embodiment illustrated in FIG. 10, and therefore can cool the secondary battery 55 in the same way as the second embodiment.

(d) Interior-Heating and Device-Heating Operation Mode

In the interior-heating and device-heating operation mode, the controller controls the operation of the first three-way valve 14a so as to connect the refrigerant outlet side of the interior condenser 13 to one refrigerant inlet side of the first merging portion 12a. The controller also controls the operation of the second three-way valve 14b so as to connect the refrigerant outlet side of the auxiliary heat exchanger 15 to the other one of the refrigerant inlets of the first merging portion 12b.

Further, the controller closes the bypass passage opening/closing valve 16a, opens the suction side opening/closing valve 18a, closes the opening/closing valve 19a for cooling, closes the opening/closing valve 21a for the battery, and closes the expansion-valve bypass passage opening/closing valve 24a. In this way, in the interior-heating and device-heating operation mode, the refrigeration cycle device 10 is switched to the refrigerant flow path for allowing the refrigerant to flow therethrough as indicated by thick arrows of FIG. 20.

The control signal to be output to the expansion valve 21 for the battery is determined such that the refrigerant pressure of the inside of the auxiliary heat exchanger 15 sets the battery temperature Tb in an appropriate temperature range (in this embodiment, 10 to 40° C.). The throttle opening of the expansion valve 21 for the battery determined in the interior-heating and device-heating operation mode is large with respect to a predetermined throttle opening determined in the interior-cooling and device-cooling operation mode or the device-cooling operation mode. Thus, the amount of decompression of the refrigerant by the expansion valve 21 for the battery in the interior-heating and device-heating operation mode is smaller than that in the interior-cooling and device-cooling operation mode or the device-cooling operation mode.

Figure 24:
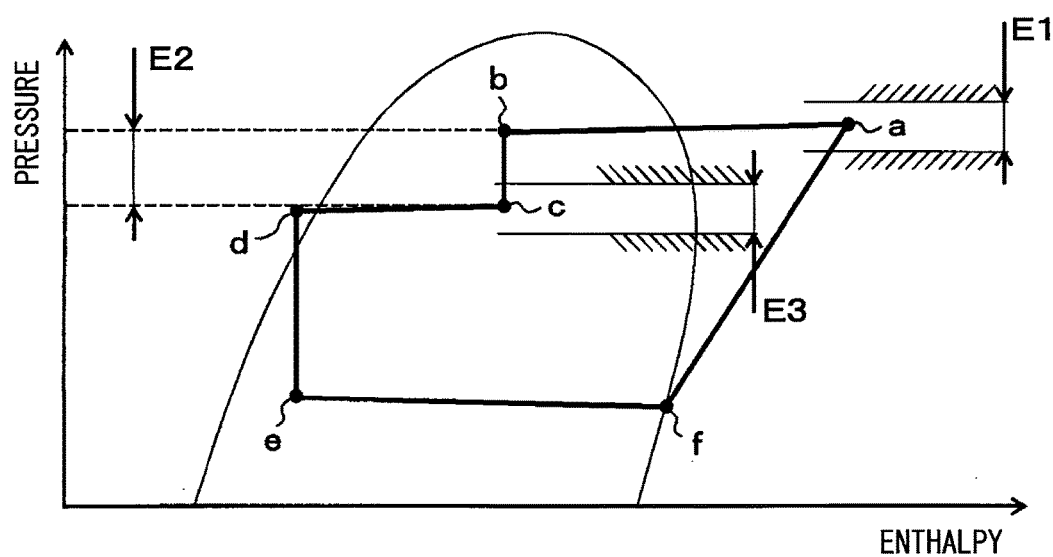
FIG. 24 is a Mollier chart showing a state of refrigerant in an interior-heating and device-heating operation mode of the refrigeration cycle device in the fifth embodiment.

The operations other than those described above are the same as those in the interior-heating and device-heating operation mode of the first embodiment. Thus, the refrigeration cycle device 10 of this embodiment allows the state of the refrigerant to change as illustrated in a Mollier chart of FIG. 24. Referring to FIG. 24, E1 indicates a range of pressure that can achieve heating of air, E2 indicates an amount of decompression performed by the expansion valve for the battery, and E3 is a range of pressure that can achieve appropriate heating of the battery. The high-pressure refrigerant discharged from the compressor 11 flows into the interior condenser 13, and exchanges heat with the air for the interior to dissipate heat therefrom (as indicated from the point a to point b in FIG. 24).

In this way, the air for the interior is heated, thereby achieving the heating of the vehicle interior. At this time, the refrigerant discharge capacity of the compressor 11 is determined such that the blown air temperature TAV approaches the target air outlet temperature TAO, whereby the pressure of the refrigerant in the interior condenser 13 is adjusted to a pressure that can achieve heating of the vehicle interior (that is, a pressure that can heat the air for the interior up to a temperature of approximately 40 to 60° C.).

The refrigerant having flowed from the interior condenser 13 flows into the expansion valve 21 for the battery via the first three-way valve 14a and the first branch portion 12a to be decompressed into an intermediate pressure (as indicated by the point b to the point c of FIG. 24). The expansion valve 21 for the battery allows the refrigerant to flow into the auxiliary heat exchanger 15 to exchange heat with the air for the battery, thereby dissipating heat from the refrigerant (as indicated by the point c to the point d of FIG. 21).

In this way, the air for the battery is heated. The heated air for the battery is blown to the battery 55 by the blower 52, thereby warming up the battery 55. At this time, the pressure of the refrigerant in the auxiliary heat exchanger 15 is adjusted to a pressure at which the battery temperature Tb ranges from approximately 10 to 40° C.

Figure 21:
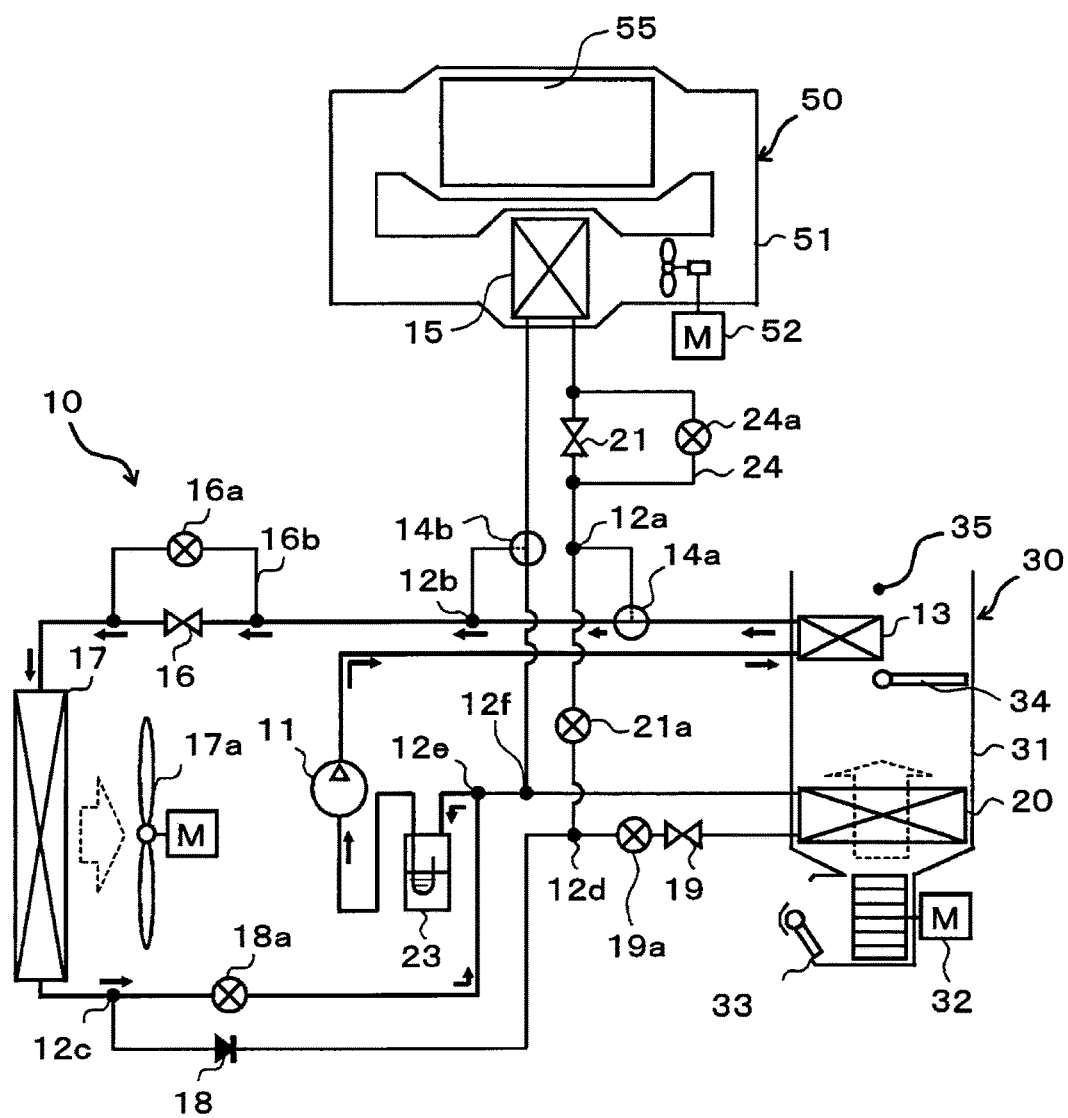
FIG. 21 is an entire configuration diagram showing a refrigerant flow in a heating operation mode of the refrigeration cycle device in the fifth embodiment.
Figure 22:
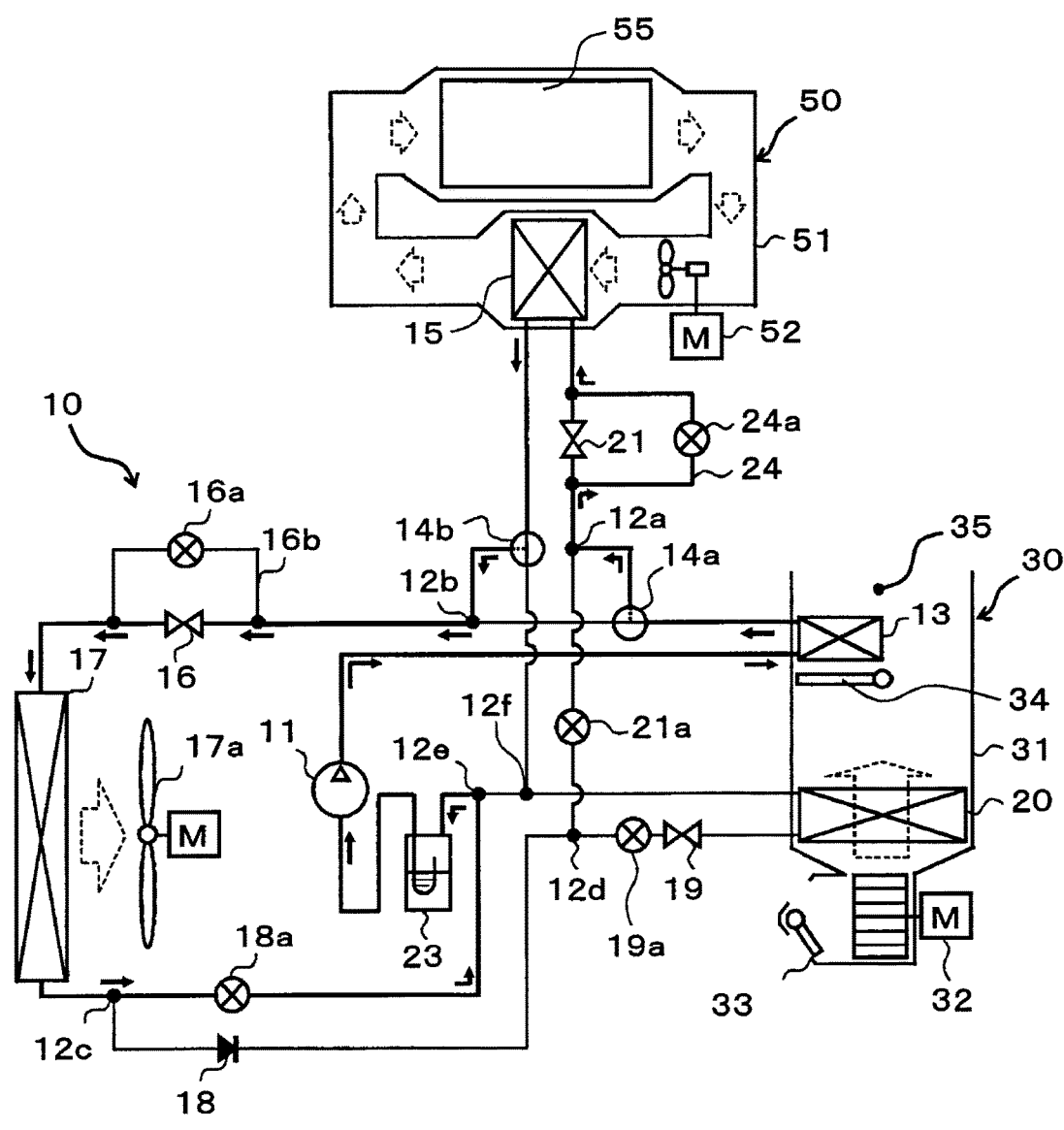
FIG. 22 is an entire configuration diagram showing a refrigerant flow in a device-heating operation mode of the refrigeration cycle device in the fifth embodiment.
Figure 23:
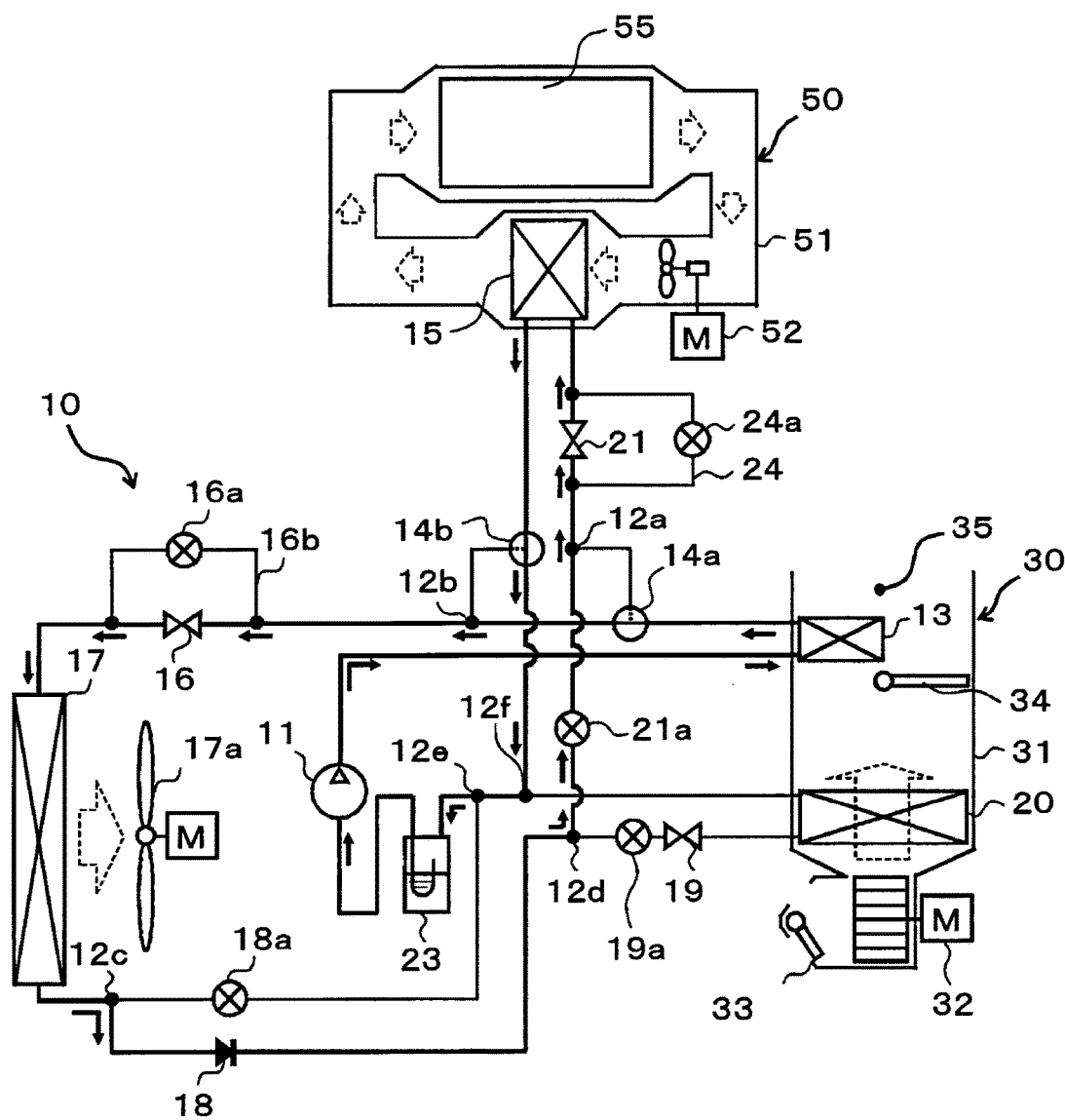
FIG. 23 is an entire configuration diagram showing a refrigerant flow in an interior-heating and device-cooling operation mode of the refrigeration cycle device in the fifth embodiment.

The refrigerant having flowed from the auxiliary heat exchanger 15 flows into the expansion valve 16 for heating via the second three-way valve 14b and first merging portion 12b to be decompressed into a low pressure (as indicated by the point d to the point e of FIG. 21). The low-pressure refrigerant decompressed by the expansion valve 16 for heating flows into the exterior heat exchanger 17, and absorbs heat from the outside air blown from the blower fan 17a to evaporate itself (as indicated by the point e to the point f of FIG. 21).

With the opening/closing valve 19a for cooling and the opening/closing valve 21a for the battery closed, and with the suction side opening/closing valve 18a opened, the refrigerant having flowed from the exterior heat exchanger 17 flows into the accumulator 23 via the second branch portion 12c, suction side opening/closing valve 18a, and second merging portion 12e. The gas-phase refrigerant separated by the accumulator 23 is sucked into the compressor 11 and compressed therein again (as indicated from the point f to the point a of FIG. 21).

Thus, in the interior-heating and device-heating operation mode, the air for the interior can be heated by the interior condenser 13 to thereby heat the vehicle interior, while the air for the battery can be heated by the auxiliary heat exchanger 15 to thereby warm up the secondary battery 55.

(e) Heating Operation Mode

In the heating operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f.

Further, the controller closes the bypass passage opening/closing valve 16a, opens the suction side opening/closing valve 18a, closes the opening/closing valve 19a for cooling, and closes the opening/closing valve 21a for the battery. The expansion-valve bypass passage opening/closing valve 24a maintains the opened/closed state of the previous operation mode like the cooling mode. In this way, in the heating operation mode, the refrigeration cycle device 10 performs switching to the refrigerant flow path for allowing the refrigerant to flow therethrough as indicated by thick arrows of FIG. 21.

The operations other than those described above are the same as those in the heating operation mode of the second embodiment. In the heating operation mode, this embodiment can perform switching to the cycle structure that is substantially the same as that in the heating operation mode of the second embodiment illustrated in FIG. 12, and therefore can heat the vehicle interior in the same way as the second embodiment.

(f) Device-Heating Operation Mode

In the device-heating operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to the other one of the refrigerant inlets of the first merging portion 12b.

Further, the controller closes the bypass passage opening/closing valve 16a, opens the suction side opening/closing valve 18a, closes the opening/closing valve 19a for cooling, closes the opening/closing valve 21a for the battery, and opens the expansion-valve bypass passage opening/closing valve 24a. In this way, in the device-heating operation mode, the refrigeration cycle device 10 is switched to the refrigerant flow path through which the refrigerant flows as indicated by thick arrows of FIG. 22.

The operations other than those described above are the same as those in the device-heating operation mode of the second embodiment. In the device-heating operation mode, this embodiment can perform switching to the cycle structure that is substantially the same as that in the device-heating operation mode of the second embodiment illustrated in FIG. 13, and therefore can heat the secondary battery 55 in the same way as the second embodiment.

(g) Interior-Heating and Device-Cooling Operation Mode

In the interior-heating and device-cooling operation mode, the controller controls the operation of the first three-way valve 14a so as to connect the refrigerant outlet side of the interior condenser 13 to one refrigerant inlet side of the first merging portion 12b. The controller also controls the operation of the second three-way valve 14b so as to connect the refrigerant outlet side of the auxiliary heat exchanger 15 to one of the refrigerant inlets of the third merging portion 12f.

Further, the controller closes the bypass passage opening/closing valve 16a, closes the suction side opening/closing valve 18a, closes the opening/closing valve 19a for cooling, opens the opening/closing valve 21a for the battery, and closes the expansion-valve bypass passage opening/closing valve 24a. In this way, in the interior-heating and device-cooling operation mode, the refrigeration cycle device 10 is switched to the refrigerant flow path for allowing the refrigerant to flow therethrough as indicated by thick arrows of FIG. 23.

In this embodiment, the operation of the expansion valve 16 for heating is controlled in the same manner as in the heating operation mode or the like. Thus, the high-pressure refrigerant discharged from the compressor 11 flows into the expansion valve 16 for heating from the interior condenser 13 to the first three-way valve 14a, and the first merging portion 12b in that order in the same way as the interior-heating and device-cooling operation mode of the second embodiment.

The refrigerant decompressed by the expansion valve 16 for heating flows into the exterior heat exchanger 17, and absorbs heat from the outside air blown from the blower fan 17a to evaporate itself. With the suction side opening/closing valve 18a, opening/closing valve 19a for cooling, and expansion-vale bypass passage opening/closing valve 24a closed, and with the opening/closing valve 21a for the battery opened, the refrigerant having flowed from the exterior heat exchanger 17 flows into the expansion valve 21 for the battery via the opening/closing valve 21a for the battery.

The refrigerant decompressed by the expansion valve 21 for the battery flows into the auxiliary heat exchanger 15, and absorbs heat from the air for the battery blown from the blower 52 to evaporate itself. In this way, the air for the battery is cooled. The operations following this step will be the same as those in the device-cooling operation mode. Thus, in the interior-heating and device-cooling operation mode, the vehicle interior can be heated and the secondary battery 55 can be cooled in the same way as the second embodiment.

In the interior-heating and device-cooling operation mode of this embodiment, the controller causes the bypass passage opening/closing valve 16a to be closed, and the exterior heat exchanger 17 to serve as an evaporator. Thus, the expansion-valve bypass passage opening/closing valve 24a may be opened, and the refrigerant-evaporation temperature in the exterior heat exchanger 17 may be equal to the refrigerant-evaporation temperature in the auxiliary heat exchanger 15.

As mentioned in the first and second embodiments, the controller may cause the bypass passage opening/closing valve 16a to be opened and the exterior heat exchanger 17 to serve as the radiator. In this case, with the expansion-valve bypass passage opening/closing valve 24a closed, the refrigerant decompressed by the expansion valve 21 for the battery may be evaporated by the auxiliary heat exchanger 15.

In addition to the operation modes described above, the refrigeration cycle device 10 of this embodiment can also achieve the interior-cooling and device-heating operation mode in which the vehicle interior is cooled and the secondary battery 55 is heated at the same time, like the first and second embodiments.

Specifically, in the interior-cooling and device-heating operation mode, the controller controls the operations of the first and second three-way way valves 14a and 14b to open the bypass passage opening/closing valve 16a, to close the suction side opening/closing valve 18a, to open the opening/closing valve 19a for cooling, to close the opening/closing valve 21a for the battery, and to open the expansion-valve bypass passage opening/closing valve 24a, in the same way as the second embodiment.

As mentioned above, the refrigeration cycle device 10 of this embodiment can heat or cool the air for the interior as the first temperature-adjustment subject, thereby achieving the air-conditioning of the vehicle interior. Further, the refrigeration cycle device can heat or cool the air for the battery as the second temperature-adjustment subject, thereby achieving the temperature adjustment of the secondary battery 55.

Further in the refrigeration cycle device 10 of this embodiment, like the interior-heating and device-heating operation mode, the refrigerant flowing into the auxiliary heat exchanger 15 can be decompressed by the expansion valve 21 for the battery even when the refrigerant flow-path switch performs switching to the first refrigerant flow path. That is, the expansion valve 21 for the battery can serve as an intermediate decompressor described in the accompanied claims.

Thus, in the interior-heating and device-heating operation mode, this embodiment uses the high-pressure refrigerant discharged from the compressor 11 as a heat source, thereby heating the air for the interior, and also uses the intermediate-pressure refrigerant decompressed by the expansion valve 21 for the battery as another heat source, thereby heating the air for the battery.

At this time, the amount of decompression of the refrigerant at the expansion valve 21 for the battery can be adjusted to easily control or adjust the temperature of refrigerant dissipating heat at the auxiliary heat exchanger 15 in a temperature range that is lower than the temperature of refrigerant dissipating heat at the interior condenser 13. This arrangement can easily control a difference in temperature between the air for the interior heated by the interior condenser 13 and the air for the battery heated by the auxiliary heat exchanger 15.

OTHER EMBODIMENTS

The present invention is not limited to the above embodiments, and various modifications and changes can be made to those embodiments without departing from the scope of the present disclosure.

(1) Although the refrigeration cycle device 10 in the above-mentioned embodiments is applied to the electric vehicle by way of example, it is obvious that the refrigeration cycle device of the present disclosure may be applied to normal vehicles that use a driving force for traveling produced by an internal combustion engine, and hybrid vehicles that use a driving force for traveling produced by both an internal combustion engine and an electric motor for traveling. In applying the refrigeration cycle device of the present disclosure to the vehicle with the internal combustion engine, a heater core may be provided for heating the air for the interior using coolant of the internal combustion engine as a heat source.

Further, the refrigeration cycle device 10 may be applied to any device other than the vehicles. For example, the first temperature-adjustment subject may be air to be blown into an interior, and the second temperature-adjustment subject may be a heat medium for adjusting the temperature of a power-generating device.

(2) Although the above-mentioned embodiments are adapted to heat or cool the air for the interior to be blown into a space for air conditioning as the first temperature-adjustment subject by way of example, the first temperature-adjustment subject is not limited thereto. For example, the first temperature-adjustment subjects for use may include drinking water, daily life water, and the like.

Although the above-mentioned embodiments are adapted to heat or cool the second temperature-adjustment subject to thereby cool or heat the secondary battery 55, any device other than the battery may be cooled or heated. For example, the second temperature-adjustment subjects to be cooled or heated may include an internal combustion engine (engine), an electric motor, an inverter, a transmission, and the like.

(3) Although in the above-mentioned embodiments, the interior evaporator 20 and auxiliary heat exchanger 15 (water-refrigerant heat exchangers 15a, secondary battery 55) are connected in parallel when the refrigerant flow-path switch performs switching to the second refrigerant flow path by way of example, the interior evaporator 20 and the auxiliary heat exchanger 15 may be connected in series.

(4) Although in the above-mentioned embodiments, the temperature detector for detecting the battery temperature Tb is the temperature sensor for detecting the temperature of a main body of the secondary battery 55 by way of example, the temperature detector is not limited thereto. For example, the first embodiment may employ a temperature detector for detecting the temperature of the air for the battery provided directly after passing through the secondary battery 55.

Alternatively, the second embodiment may employ a temperature detector for detecting the temperature of the heat medium obtained directly after passing through the secondary battery 55.

What is claimed is:

1. A refrigeration cycle device comprising:
   a compressor compressing and discharging a refrigerant;
   an exterior heat exchanger that exchanges heat between outside air and the refrigerant discharged from the compressor;
   a heat dissipation heat exchanger configured to exchange heat between a first temperature-adjustment subject and the refrigerant discharged from the compressor;
   an auxiliary heat exchanger that exchanges heat between the refrigerant and a second temperature-adjustment subject;
   an intermediate decompressor;
   a refrigerant flow-path switch that switches between refrigerant flow paths in each path which the refrigerant circulates in a cycle, wherein the refrigerant flow-path switch is capable of switching at least between a first refrigerant flow path and a second refrigerant flow path, the refrigerant flow-path switch includes a valve that is located downstream of the heat dissipation heat exchanger and upstream of the exterior heat exchanger, and the valve is configured to switch between a refrigerant passage through which the refrigerant flows into the auxiliary heat exchanger and a refrigerant passage that bypasses the auxiliary heat exchanger; and
   a branch portion that is located downstream of the exterior heat exchanger and upstream of the compressor, wherein
   in a heating mode for heating the first temperature-adjustment subject, the heat dissipation heat exchanger dissipates heat from the refrigerant, and allows the refrigerant to flow out toward the inlet side of the exterior heat exchanger,
   in the first refrigerant flow path,
      (i) the refrigerant discharged from the compressor flows into the heat dissipation heat exchanger,
      (ii) the auxiliary heat exchanger is located downstream of the heat dissipation heat exchanger and upstream of the exterior heat exchanger in a refrigerant flow,
   in the second refrigerant flow path,
      (i) the refrigerant discharged from the compressor flows directly into the heat dissipation heat exchanger,
      (ii) the exterior heat exchanger is located downstream of the heat dissipation heat exchanger and upstream of the auxiliary heat exchanger in the refrigerant flow,
   the intermediate decompressor decompresses the refrigerant flowing into the auxiliary heat exchanger when the first refrigerant flow path is switched by the refrigerant flow-path switch,
   a flow direction of the refrigerant in the auxiliary heat exchanger, when the first refrigerant flow path is switched by the refrigerant flow-path switch in the heating mode, is the same as that of the refrigerant in the auxiliary heat exchanger when the second refrigerant flow path is switched by the refrigerant flow-path switch in a cooling mode for cooling the first temperature-adjustment subject,
   a refrigerant passage located downstream of the exterior heat exchanger is branched at the branch portion into a branch passage through which the refrigerant flows into the auxiliary heat exchanger and a refrigerant passage that bypasses the auxiliary heat exchanger, and the refrigerant flow-path switch includes an opening-closing valve that is located in the branch passage.

2. The refrigeration cycle device according to claim 1, further comprising:
   a decompressor decompressing the refrigerant flowing from the exterior heat exchanger;
   an evaporation heat exchanger configured to exchange heat between the refrigerant decompressed by the decompressor and the first temperature-adjustment subject, the evaporation heat exchanger evaporating the refrigerant and allowing the refrigerant to flow out toward the suction port side of the compressor, wherein
   the refrigerant passage extends from an outlet of the exterior heat exchanger to an inlet of the evaporation heat exchanger, and
   the branch passage extends from the branch portion to the auxiliary heat exchanger,
   when the second refrigerant flow path is switched by the refrigerant flow-path switch, the refrigerant flowing out of the exterior heat exchanger flows into the auxiliary heat exchanger through the branch passage, and the refrigerant flowing from the auxiliary heat exchanger is guided to the suction side of the compressor.

3. The refrigeration cycle device according to claim 1, further comprising:
   a temperature detector detecting a physical quantity having a correlation with a temperature of the second temperature-adjustment subject, wherein
   the refrigerant flow-path switch performs switching to the first refrigerant flow path when a detection temperature detected by the temperature detector is equal to or lower than a first reference temperature predetermined, and
   the refrigerant flow-path switch performs switching to the second refrigerant flow path when the detection temperature is equal to or higher than a second reference temperature predetermined.

4. The refrigeration cycle device according to claim 1, wherein
   in the first refrigerant flow path, the refrigerant discharged from the compressor flows into the heat dissipation heat exchanger, the auxiliary heat exchanger, and the exterior heat exchanger in this order, and
   in the second refrigerant flow path, the refrigerant discharged from the compressor flows into the heat dissipation heat exchanger, the exterior heat exchanger, and the auxiliary heat exchanger.

5. The refrigeration cycle device according to claim 1, wherein
   the first temperature-adjustment subject is an air for a vehicle interior, and
   the second temperature-adjustment subject is an air for an electric device.

6. The refrigeration cycle device according to claim 1, wherein
   in the first and second refrigerant flow paths, the refrigerant discharged from the compressor initially flows into the heat dissipation heat exchanger.

7. The refrigeration cycle device according to claim 1, wherein
   in the first and second refrigerant flow paths, the compressor is in direct fluid communication with the heat dissipation heat exchanger.

8. The refrigeration cycle device according to claim 1, wherein in the first and second refrigerant flow paths, the compressor is directly adjacent to the heat dissipation heat exchanger.

9. The refrigeration cycle device according to claim 1, wherein
in the first and second refrigerant flow paths, the refrigerant discharged from the compressor flows into the exterior heat exchanger only after flowing into the heat dissipation heat exchanger.

10. The refrigeration cycle device according to claim 1, wherein
a singular flow direction of the refrigerant in the auxiliary heat exchanger, when the first refrigerant flow path is switched by the refrigerant flow-path switch in the heating mode, is the same as that of the refrigerant in the auxiliary heat exchanger when the second refrigerant flow path is switched by the refrigerant flow-path switch in the cooling mode for cooling the first temperature-adjustment subject.

11. The refrigeration cycle device according to claim 1, wherein
the auxiliary heat exchanger is located adjacent to a battery.

12. The refrigeration cycle device according to claim 1, wherein
the auxiliary heat exchanger is located within a casing that also contains a battery.

13. The refrigeration cycle device according to claim 12, wherein
the casing is a metal casing.

14. The refrigeration cycle device according to claim 1, wherein
in the first refrigerant flow path,
the valve switches a refrigerant passage located downstream of the heat dissipation heat exchanger to the refrigerant passage through which the refrigerant flows into the auxiliary heat exchanger, and
the opening-closing valve closes the branch passage such that the refrigerant flowing out of the exterior heat exchanger bypasses the auxiliary heat exchanger, and
in the second refrigerant flow path,
the valve switches the refrigerant passage located downstream of the heat dissipation heat exchanger to the refrigerant passage that bypasses the auxiliary heat exchanger such that the refrigerant flowing out of the heat dissipation heat exchanger bypasses the auxiliary heat exchanger, and
the opening-closing valve opens the branch passage such that the refrigerant flowing out of the exterior heat exchanger flows into the auxiliary heat exchanger.

15. A refrigeration cycle device comprising:
a compressor compressing and discharging a refrigerant;
an exterior heat exchanger that exchanges heat between outside air and the refrigerant discharged from the compressor;
a heat dissipation heat exchanger configured to exchange heat between a first temperature-adjustment subject and the refrigerant discharged from the compressor;
an auxiliary heat exchanger that exchanges heat between the refrigerant and a second temperature-adjustment subject;
an intermediate decompressor;
a refrigerant flow-path switch that switches between refrigerant flow paths in each path which the refrigerant circulates in a cycle, wherein the refrigerant flow-path switch is capable of switching at least between a first refrigerant flow path and a second refrigerant flow path; and
a branch portion that is located downstream of the exterior heat exchanger and upstream of the compressor, wherein
in a heating mode for heating the first temperature-adjustment subject, the heat dissipation heat exchanger dissipates heat from the refrigerant, and the refrigerant flows out toward the inlet side of the exterior heat exchanger,
in the first refrigerant flow path,
(i) the refrigerant discharged from the compressor flows into the heat dissipation heat exchanger,
(ii) the auxiliary heat exchanger is located downstream of the heat dissipation heat exchanger and upstream of the exterior heat exchanger in a refrigerant flow,
in the second refrigerant flow path,
(i) the refrigerant discharged from the compressor flows into the heat dissipation heat exchanger,
(ii) the exterior heat exchanger is located downstream of the heat dissipation heat exchanger and upstream of the auxiliary heat exchanger in the refrigerant flow,
the intermediate decompressor decompresses the refrigerant flowing into the auxiliary heat exchanger when the first refrigerant flow path is switched by the refrigerant flow-path switch,
a singular flow direction of the refrigerant in the auxiliary heat exchanger, when the first refrigerant flow path is switched by the refrigerant flow-path switch in the heating mode, is the same as that of the refrigerant in the auxiliary heat exchanger when the second refrigerant flow path is switched by the refrigerant flow-path switch in a cooling mode for cooling the first temperature-adjustment subject,
a refrigerant passage located downstream of the exterior heat exchanger is branched at the branch portion into
a branch passage through which the refrigerant flows into the auxiliary heat exchanger and
a refrigerant passage that bypasses the auxiliary heat exchanger, and the refrigerant flow-path switch includes an opening-closing valve that is located in the branch passage.

16. The refrigeration cycle device according to claim 15, wherein
the auxiliary heat exchanger is located adjacent to a battery.

17. The refrigeration cycle device according to claim 15, wherein
the auxiliary heat exchanger is located within a casing that also contains a battery.

18. The refrigeration cycle device according to claim 17, wherein
the casing is a metal casing.

* * * * *